United States Patent
Chang et al.

(10) Patent No.: US 7,492,668 B2
(45) Date of Patent: Feb. 17, 2009

(54) SYSTEM AND METHOD FOR PRESSURE WAVE TRANSMISSION AND MEASUREMENT

(75) Inventors: Timothy Chang, Montville, NJ (US); Biao Cheng, Edison, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 0 days.

(21) Appl. No.: 11/833,484

(22) Filed: Aug. 3, 2007

(65) Prior Publication Data

US 2008/0037371 A1 Feb. 14, 2008

Related U.S. Application Data

(60) Provisional application No. 60/836,628, filed on Aug. 9, 2006.

(51) Int. Cl.
*H04B 1/02* (2006.01)
(52) U.S. Cl. ...................................... 367/137
(58) Field of Classification Search ................... 367/137
See application file for complete search history.

(56) References Cited

U.S. PATENT DOCUMENTS

| | | | | |
|---|---|---|---|---|
| 2004/0039282 | A1* | 2/2004 | Szabo et al. | 600/437 |
| 2008/0037371 | A1* | 2/2008 | Chang et al. | 367/137 |

FOREIGN PATENT DOCUMENTS

WO WO/2008/021757 * 2/2008

OTHER PUBLICATIONS

Altes, R. A., and Reese, W. E., "Doppler-tolerant classification of distributed targets-a bionic sonar," IEEE Transactions on Aerospace and Electronic Systems AES-11, pp. 708-724, 1975.
Altes, R. A., "Sonar for generalized target description and its similarity to animal echolocation systems," Journal of the Acoustical Society of America 59, pp. 97-105, 1976.
Ashley, S., "Wrap drive underwater," Sci. Amer., vol. 284, pp. 70-79, May 2001.
Chang, T.N., Godbole, K., and Hou, E., "Optimal input shaper design for high-speed robotic workcells," Journal of Vibration and Control, vol. 9, pp. 1359-1376, 2003.
Cobo, P., "Application of shaping deconvolution to the generation of arbitrary acoustic pulses with conventional sonar transducers," Journal of Sound and Vibration 188(1), pp. 131-144, 1995.
Gachagan, A., Hayward, G., Kelly, S. P., Galbraith, W., "Characterization of air-coupled transducers," IEEE Transactions on Ultrasonics, Ferroelectrics, and Frequency Control, vol. 43, Issue 4, Jul. 1996, pp. 678-689.

(Continued)

*Primary Examiner*—Dan Pihulic
(74) *Attorney, Agent, or Firm*—Timothy X. Gibson; Gibson & Dernier LLP

(57) ABSTRACT

A system and method for measurement are disclosed which may include providing an input command signal; convolving the input command signal with a plurality of impulse signals to produce a transducer drive signal; and activating a first pressure transducer with the drive signal to transmit a pressure wave output from the transducer.

31 Claims, 36 Drawing Sheets

OTHER PUBLICATIONS

Hayward, G., Macleod, C.J., Durran, T.S., "Systems model of the thickness mode piezoelectric transducer," Journal of the Acoustical Society of America vol. 76, Issue 2, Aug. 1984, pp. 369-382.

Li, Xi, Wu, Renbiao, Rasmi, Srihari, Li Jian, Cattafesta, Louis N. III, and Sheplak, Mark, "Acoustic Proximity Ranging in the Presence of Secondary Echoes," IEEE Transactions on Instrumentation and Measurement, vol. 52, No. 5, pp. 1593-1605, 2003.

Mandersson, Bengt and Salomonsson, Goran, "Weighted Least-Squares Pulse-Shaping Filters With Application to Ultrasonic Signals," IEEE Transactions on Ultrsonics, Ferroelectronics, and Frequency Control, vol. 36, No. 1, pp. 109-113, 1989.

Manthey, W., Kroemer, N., and Magori V., "Ultrasonic transducers and transducer arrays for applications in air," Meas. Sci. Technol., vol. 3, pp. 249-261, 1992.

Piquette, J. C., "Method for transducer transient suppression. I: Theory," Journal of the Acoustical Society of America 92, pp. 1203-1213, 1992.

Piquette, J. C., "Method for transducer transient suppression. II: Experiment," Journal of the Acoustical Society of America 92, pp. 1214-1221, 1992.

Piquette, J. C., and Forsythe, S. E., "Transducer transient suppression: Generalized methods of analysis," Journal of the Acoustical Society of America 100(3), pp. 1577-1583, 1996.

Singer, N., and Seering, W., "Preshaping Command Inputs to Reduce System Vibration," MIT Artificial Intelligence Laboratory, A.I. Memo No. 1027, Jan. 1988 and ASME J. Dynamic Systems, Measurement, and Control 112(1), pp. 76-82, 1988.

Skinner, D. P., Altes, R. A., and Jones, J. D., "Broadband target classification using a bionic sonar," Journal of the Acoustical Society of America 62, pp. 1239-1246, 1977.

Cobo, P., and Carbo, R., "Parametric equalization of sonar transducers by shaping pre-filtering and its effect on the directivity pattern," Acta Acustica 1, pp. 101-109, 1993.

International Search Report and Written Opinion of Application No. PCT/US07/75175, mailed Aug. 5, 2008.

* cited by examiner

FIG. 2
FIG. 2A
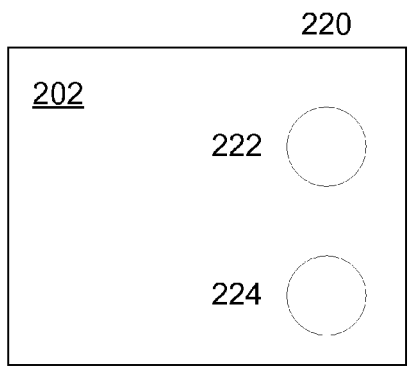
FIG. 2B
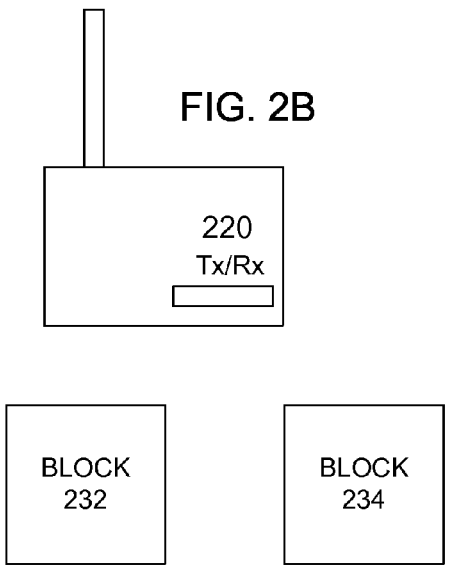

FIG. 9
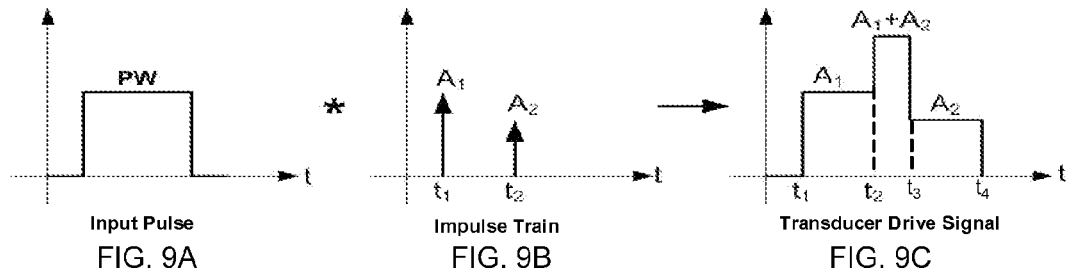
Input Pulse
FIG. 9A
Impulse Train
FIG. 9B
Transducer Drive Signal
FIG. 9C
FIG. 10
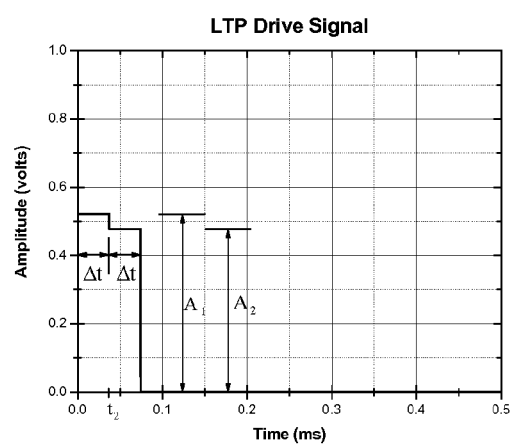
FIG. 11
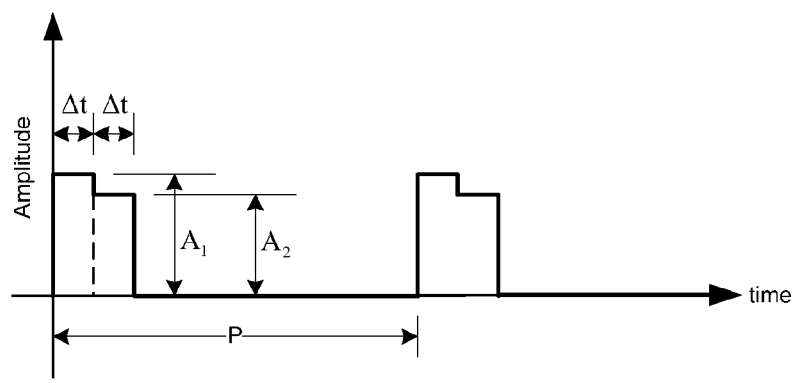

FIG. 16
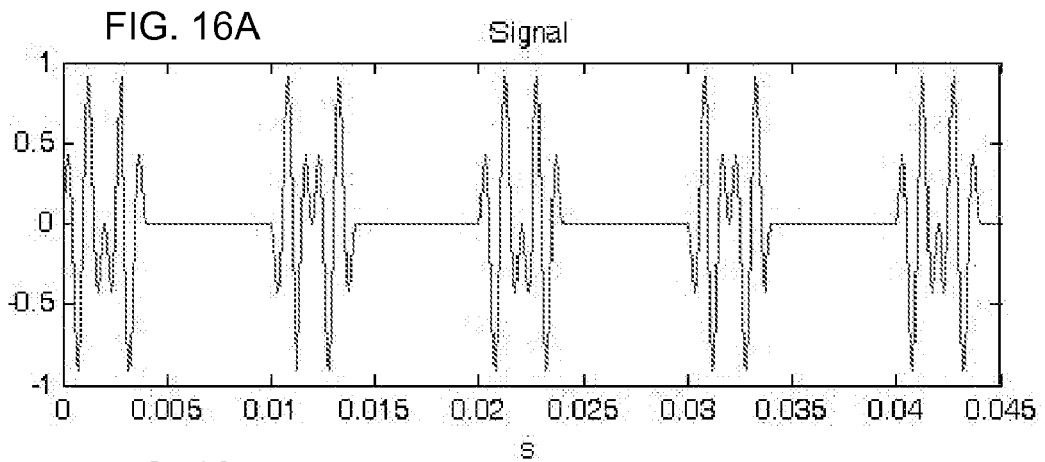
FIG. 16A
FIG. 16B
FIG. 17A
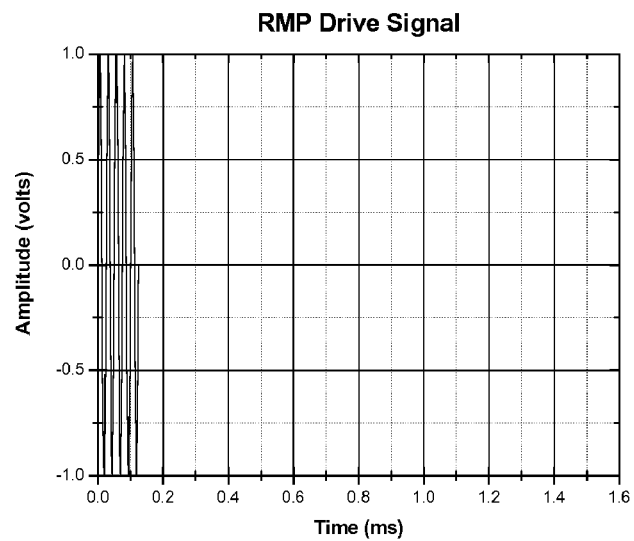

SYSTEM AND METHOD FOR PRESSURE WAVE TRANSMISSION AND MEASUREMENT

CROSS-REFERENCE TO RELATED APPLICATIONS

This application claims the benefit of U.S. Provisional Patent Application Ser. No. 60/836,628, filed Aug. 9, 2006, entitled "Enhancing Ultrasonic Imaging With Low Transient Pulse Shaping", the entire disclosure of which is incorporated herein by reference.

FIELD OF THE INVENTION

This invention relates in general to pressure wave based transmission and measurement and in particular to improving the resolution of pressure wave based measurement systems.

BACKGROUND OF THE INVENTION

The bracketed information herein refers to documents listed at the end of this document, which are referred to by reference number, author, and year of publication.

Ultrasonic ranging systems have been widely used in applications such as mobile robots, surface/subsurface feature detection, medical imaging, etc. [Manthey, 1992 (R12)] [Ashley, 2001 (R3)]. The primary performance factors of such ranging systems include: resolution, power, and scattering. Since phase information is inherent in ultrasound beam propagation and beam formation, to achieve high performance, it is preferable to transmit short duration acoustic pulses such that the phase interference is minimized. However, due to the narrow transducer bandwidth, an ultrasonic transmitter driven by a conventional Rectangular Modulation Pulse (RMP) drive signal tends to output signal energy that includes transient acoustic waves of significant duration and amplitude, which degrade system performance significantly.

Low Transient Pulse (LTP) signals, as opposed to the RMP acoustic signals, have shorter transient pulse durations and thus incur less phase interference and thereby experience better performance. Providing a prescribed signal to drive the transmitter may enable production of signals with low transient pulse energy.

A number of methods have been proposed in connection with the design of a prescribed excitation signal. Zero-phase cosine-magnitude pulses [Berkhout, 1984 (R4)] and [Cobo, 1993 (R6)] are optimally synthesized for high resolution acoustic imaging applications. Such drive signals are synthesized by the inversion of the transducer transfer function and the prescribed transmitted acoustic signal spectrum. The bionic pulse method [Altes, 1975 (R1)] [Altes, 1976 (R2)] [Skinner, 1977 (R17)] minimizes the frequency and amplitude variations caused by Doppler effects. Such pulses are aimed at Doppler tolerant applications, and the drive signal is generated by the inversion of the transmitter transfer function and the defined bionic spectrum so that the Doppler effects on acoustic signals are minimized. The weighted least-squares filter [Mandersson, 1989 (R11)] is a least-squares filter modified by introducing a weighting function that defines the resolution of an ultrasonic transducer. To pre-shape the drive signal, the filter impulse response is evaluated by minimizing the weighting error between the received acoustic echo signal corrupted with noise and the desired acoustic echo signal such that the duration of the ultrasonic echoes is decreased. Parametric shaping deconvolution [Cobo, 1995 (R7)] is an approach that generates the desired drive signal by inverting the transmitter transfer function and the desired acoustic waveform with a suitably selected regularization parameter, which provides stabilization and results in a narrower acoustic pulse transmitted at the cost of the amplitude loss. The transducer transient suppression [Piquette, 1992 (R13), (R14)] is a method for suppressing the transients of the transmitted acoustic pulses where the transient-suppressing drive signal is approximated using a backward solution of the equivalent LCR circuit of a spherical transducer. In [Piquette, 1996 (R15)], an exact expression of the transient-suppressing drive signal for an equivalent circuit containing exclusively lumped passive elements is further derived by introducing the Heaviside unit step function to describe the desired transient-suppressing circuit output. The numerical realization of such transient-suppressing drive is obtained by adopting an approximation to the delta function. [Piquette, 1996 (R15)] also addresses an approach to generating an approximate transient-suppressing drive by inverting the transducer discrete-time transfer function and the desired transmitted acoustic signal. Besides preshaping the drive signals, algorithms of the time of flight estimation are usually used to enhance the resolution in acoustic ranging systems. For example, the multiecho parameter estimation for acoustic ranging systems [Li, 2003 (R10)] is a time-of-flight estimation algorithm for the joint proximity range estimation and the secondary echo mitigation.

There is a need in the art for a system and method for sonic wave based measurement that reduces transient energy in transmitted waves to levels lower than that available in existing systems.

SUMMARY OF THE INVENTION

As ultrasonic transducers are operated at a relatively high nominal frequency and quality factor, feedforward strategy is among the most efficient means for generating the low transient acoustic pulses. In an embodiment, a digital signal processor and a field programmable gate array may synthesize the transmitter drive signal to emit low transient pulses which are then applied to the detection of surface features. Both simulation and experimental results confirm an improved spatial detection resolution due to the lower acoustic transient signals and interference therefrom. The drive signal synthesis process is also simpler than the conventional modulation method and should result in a lower cost of implementation.

Various embodiments herein address the generation of low transient acoustic pulses to enhance system resolution and to simplify hardware requirements. Command shaping is a feedforward method aimed at reducing the command-induced oscillatory transients of systems with underdamped characteristics. This method can be successfully applied to various mechanical systems with the objective to reach set points in minimum time and oscillation. In the context of ultrasonic systems, the method can be further enhanced to control pulse generation so that a predetermined number of acoustic cycles can be emitted from the transmitter, resulting in less acoustic interference between successive echoes. Reducing interference between echoes directly results in better target feature detection. The hardware to generate the pulse sequence is also simpler than that of the conventional methods as no frequency modulation is required.

According to one aspect, the invention provides a method for measurement that may include providing an input command signal; convolving the input command signal with a plurality of impulse signals to produce a transducer drive signal; and activating a first pressure transducer with the drive signal to transmit a pressure wave output from the transducer.

Preferably, the method further includes transmitting the pressure wave output toward a target using the first pressure transducer; and receiving reflected pressure wave energy from the target at a second pressure transducer. Preferably, the method further includes calculating at least one geometric characteristic of a surface topology of the target based on the reflected pressure wave energy. Preferably, the target includes a heterogeneous three-dimensional structure. Preferably, the method further includes calculating at least one acoustic property of the structure. Preferably, the method further includes transmitting the pressure wave output from a first point along a medium to a second point along a medium using the first pressure transducer; receiving pressure wave energy using a second pressure transducer located at the second point along the medium; and calculating at least one characteristic of the medium based on the received pressure wave energy.

Preferably, the medium includes at least one material selected from the group consisting of solid, liquid, and gas. Preferably, the medium includes at least one material selected from the group consisting of bone, body tissue, wood, metal, concrete, plastic, glass, and ceramic. Preferably, the input command signal is a function selected from the group consisting of a rectangular step function; a triangular function; a sinusoidal function; and a Gaussian function. Preferably, the convolving step includes convolving the input command signal with first and second impulse signals. Preferably, the second impulse signal has a lower magnitude than the first impulse signal. Preferably, the transmitting step includes transmitting only a selected number of cycles of the pressure wave output. Preferably, the pressure wave output includes an acoustic signal.

Preferably, the acoustic signal is one of a) subsonic; and b) ultrasonic. Preferably, the acoustic signal has a frequency within a range audible to human beings. Preferably, the acoustic signal has a frequency between 20 Hz (Hertz) and 18 kHz (kilohertz). Preferably, a first impulse signal has an amplitude $A_1$ equal to about: $1/(1+M_p^n)$, wherein $$M_p^n = \left(e^{-\frac{\zeta \pi}{\sqrt{1-\zeta^2}}}\right)^n,$$

$\zeta$ is the damping factor; and n is the number of half ringing cycles. Preferably, a second impulse signal has an amplitude $A_2$ equal to about: $M_p^n/(1+M_p^n)$, wherein $$M_p^n = \left(e^{-\frac{\zeta \pi}{\sqrt{1-\zeta^2}}}\right)^n,$$

$\zeta$ is the damping factor; and n is the number of half ringing cycles. Preferably, a first impulse signal has an amplitude $A_1$ determined according to: $A_1=1/(1+M_p^n)$, wherein $$M_p^n = \left(e^{-\frac{\zeta \pi}{\sqrt{1-\zeta^2}}}\right)^n,$$

$\zeta$ is the damping factor; and n is the number of half ringing cycles. Preferably, a second impulse signal has an amplitude determined according to: $A_2=M_p^n/(1+M_p^n)$, wherein $$M_p^n = \left(e^{-\frac{\zeta \pi}{\sqrt{1-\zeta^2}}}\right)^n,$$

$\zeta$ is the damping factor; and n is the number of half ringing cycles.

Preferably, a time period between a first impulse signal and a second impulse signal is determined according to: $\Delta T = n\pi/(\omega_n\sqrt{1-\zeta^2})$, wherein: n is the number of half ringing cycles, $\omega_n$ is the natural frequency of the first pressure transducer; and $\zeta$ is the damping factor of the first pressure transducer. Preferably, the drive signal includes a pulse corresponding to each impulse signal, and wherein the pulse width of each pulse is equal to $\Delta T$. Preferably, the drive signal includes a pulse corresponding to each impulse signal, and wherein the pulse width of each pulse is equal to $4\Delta T/3$.

According to another aspect, the invention may provide a method for measurement that may include providing an input command signal; convolving the input command signal with an impulse signal to produce a transducer drive signal; activating a pressure transducer with the drive signal to transmit a pressure wave output from the transducer; and setting a pulse width of the drive signal equal to a value within +/−20% of $k2\pi/\omega_d$ where $\omega_d$ is a ringing frequency of the transducer, and where k is equal to any integer greater than or equal 1. Preferably, the step of setting the pulse width includes setting the pulse width of the drive signal equal to a value within +/−5% of $k2\pi/\omega_d$.

According to yet another aspect, the invention may provide a measurement system that may include a signal generator operable to provide an input command signal, and convolve the input command signal with a plurality of impulse signals to produce a transducer drive signal; and a first pressure transducer operable to transmit a pressure wave output from the transducer upon being excited by the transducer drive signal. Preferably, the signal generator includes at least one timer for controlling the scheduling of the plurality of impulse signals. Preferably, the system further includes a second pressure transducer, located proximate to the first pressure transducer, for receiving reflections of the transmitted pressure wave output. Preferably, the system further includes a second pressure transducer, located at a distance D from the first pressure transducer, for receiving pressure wave energy transmitted along the distance D. Preferably, axial wave transmission occurs between the first transducer and the second transducer. Preferably, the system further includes at least one additional transmitting pressure transducer, thereby providing a plurality of transmitting pressure transducers; and at least one receiving pressure transducer for receiving pressure wave energy from the plurality of transmitting pressure transducers.

Other aspects, features, advantages, etc. will become apparent to one skilled in the art when the description of the preferred embodiments of the invention herein is taken in conjunction with the accompanying drawings.

BRIEF DESCRIPTION OF THE DRAWINGS

For the purposes of illustrating the various aspects of the invention, there are shown in the drawings forms that are presently preferred, it being understood, however, that the invention is not limited to the precise arrangements and instrumentalities shown.

FIG. 2A is a block diagram of a carrying plate and a pair of transducers suitable for use with the apparatus of FIG. 1;

FIG. 2B is a block diagram of the carrying plate of FIG. 2A moving over a pair of blocks;

FIG. 9 is a graphical depiction of an input command signal (FIG. 9A), a set of impulse signals (FIG. 9B), and a transducer drive signal (FIG. 9C) in accordance with an embodiment of the present invention;

FIG. 10 is a graph of amplitude versus time for a two-pulse LTP drive signal (transmitter-optimized drive signal) in accordance with an embodiment of the invention;

FIG. 11 is a graph of a periodically recurring two-pulse LTP drive signal in accordance with an embodiment of the invention;

FIG. 16A is a time domain graph of a sinusoidal shaped signal that may be used as input command signal in accordance with an alternative embodiment of the present invention;

FIG. 16B is a frequency domain graph of the signal of FIG. 16A;

DETAILED DESCRIPTION OF THE PREFERRED EMBODIMENTS

In the following description, for purposes of explanation, specific numbers, materials and configurations are set forth in order to provide a thorough understanding of the invention. It will be apparent, however, to one having ordinary skill in the art that the invention may be practiced without these specific details. In some instances, well-known features may be omitted or simplified so as not to obscure the present invention. Furthermore, reference in the specification to phrases such as "one embodiment" or "an embodiment" means that a particular feature, structure or characteristic described in connection with the embodiment is included in at least one embodiment of the invention. The appearances of phrases such as "in one embodiment" in various places in the specification do not necessarily all refer to the same embodiment.

While some embodiments herein are described as employing ultrasonic energy, the present invention is not limited to this frequency range. Pressure wave energy in any suitable frequency range may be employed, either within, below, or above the range of frequency generally audible to human beings. For the sake of convenience herein, the terms "sonic" and/or "acoustic" may refer to pressure waves and/or energy that is transmitted employing any of the above listed frequency ranges.

Topology Measurement Embodiment

Figure 1:
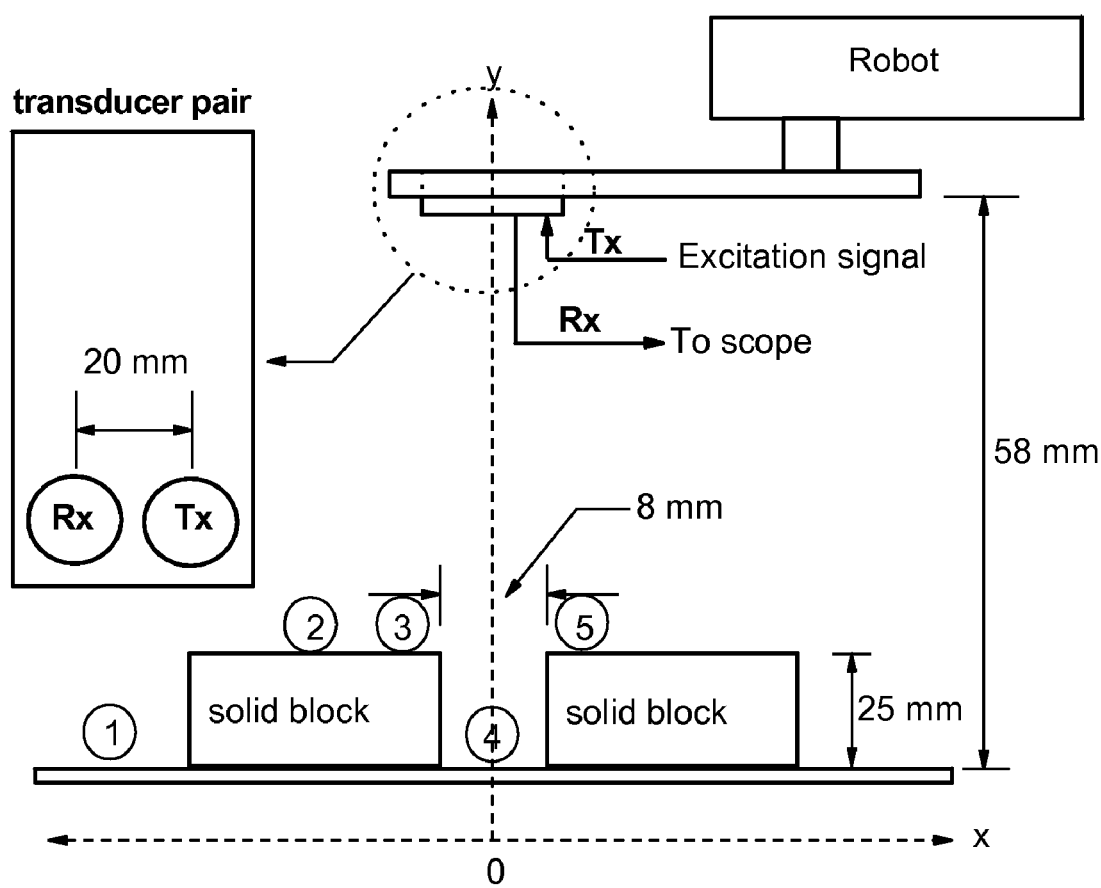
FIG. 1 is a block diagram of an apparatus for sonically measuring the topography of a surface in accordance with an embodiment of the present invention.
Figure 37:
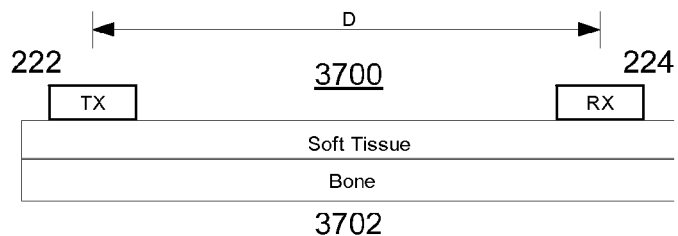
FIG. 37 is a block diagram of a simulated axial-transmission configuration of a sonic measurement system in accordance with an embodiment of the present invention.

In this embodiment, the transmission of pressure waves and measurement of waves echoing off various surfaces may be employed to measure the surface topology of one or more objects. In the embodiment of FIG. 1, a system and method in accordance with an embodiment of the invention are employed to measure the characteristics (such as width and depth) of a notch between two solid blocks. However, the inventive principles disclosed herein may be employed to measure many variations in surface topology other than a notch between two blocks. More generally, any variation in surface topology that modifies the timing, direction, and/or amplitude (or other pertinent factor) of a reflected pressure wave (in the case of an echo transmission embodiment) and/or of a transmitted pressure wave (in the case of an axial transmission embodiment) is preferably measurable using the systems and methods disclosed herein. Moreover, other configurations of the equipment shown in FIG. 1 may be employed to measure axial transmission of pressure waves through a medium, as shown in FIG. 37.

One possible apparatus configuration for measuring variation in surface topology is shown in FIG. 1. The robot, which could be a Seiko D-Tran XY-3000 robot, positions the ultrasonic transducer pair to a desired location over the test surface for the measurement of the received acoustic signals. In this embodiment, the test surface consists of 5 target points labeled 1-5 as shown in FIG. 1. One of the objectives is to detect the groove located in position 4 the geometry of which tends to induce multiple echoes. By emitting short and low-transient acoustic pulses, the incidence of echo interference can be minimized.

The ultrasonic transducers used in this experiment are air-coupled transducers [Gachagan et al. 1996 (R8)] and preferably have a resonant frequency of about 40 kHz. Transducers of this type may be obtained, for example, from the Panasonic® Corporation. However, the invention is not limited to the use of any particular type of transducer. The transducer preferably includes three major components: the piezoelectric ceramic, the matching layer and the backing layer. The piezoelectric ceramic performs the conversion between the electrical energy and the acoustic energy. While the matching layer allows transmitting as much energy out of the transducer as possible, the backing material preferably damps down the vibrations so that short duration acoustic pulses are transmitted. The ultrasonic transmitter (Tx) and receiver (Rx) may be connected, respectively, to a drive signal generation circuit and a detector (not shown).

FIG. 2A shows carrying plate 202 with transducer pair 220 coupled thereto, where transducer pair 220 may include transducers 222 and 224. FIG. 2B shows a portion of a robot manipulator holding transducer pair 220 above blocks 232 and 234. In one embodiment, transducer 222 may be transmitting transducer, and transducer 224 may be a receiving transducer.

Figure 3:
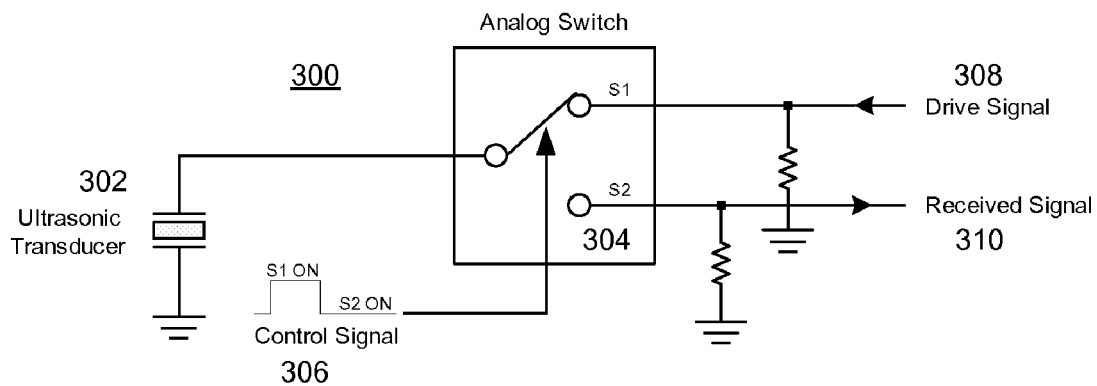
FIG. 3 is a schematic diagram of a circuit for switching between energy transmission and energy reception by a single transducer in accordance with an embodiment of the present invention.

FIG. 3 is a schematic diagram of a circuit 300 for switching between energy transmission and energy reception by a single transducer 302 in accordance with an embodiment of the present invention. Circuit 300 may include transducer 302, which may be ultrasonic, switch 304, which may be analog, an input for control signal 306, a connection for drive signal 308, and/or a connection for received signal 310. In this embodiment, transducer 302 may be used in place of transducer pair 220, shown in FIG. 2, as both transmission and reception functions could be performed by the single transducer 302.

In some ultrasonic systems, it is desirable to use a common transducer 302 as both a transmitter and as a receiver for two reasons: 1) better signal detection (since the transmitter and receiver are the same physical device and occupy the same physical location) and 2) cost savings. Circuit 300 preferably switches between the input drive signal 308 and the received signal (transducer output signal) 310 so that the two signals do not interfere with each other.

Existing modulation methods may produce very long transient signal components and may require complex schemes to separate transient signal energy from desired signal energy indicative of measurement data. For a low transient pulse (LTP) signal (which preferably corresponds to a signal in which the transient portion of the signal energy has a short duration and/or a low amplitude), the transient energy of transducer 302 may be confined to the duration of the drive signal 308, so that separation of the input and output signals may be effected through the use of switch 304. In circuit 300, the drive signal 308 is preferably a low transient pulse drive signal. Circuit 300 preferably enables the transducer 302 dynamics to be identified, which is helpful in enabling the provision of a low transient pulse signal.

Since there are several signal nodes in the system, it is more convenient to refer to the transmitter input and output signals as drive signal and acoustic signal, respectively. For comparison purposes, two types of drive signals are generated: a Rectangular Modulation Pulse (RMP) drive signal and a Low Transient Pulse (LTP) drive signal. To generate the RMP drive signal, a 400 Hz, 5% duty cycle pulse train is modulated by a 40 KHz sine wave through a signal synthesizer and a modulation circuit. The LTP drive signal, on the other hand, may be generated by a Dalanco Spry digital signal processing and data acquisition board modeled AVR-32.

Figure 4:
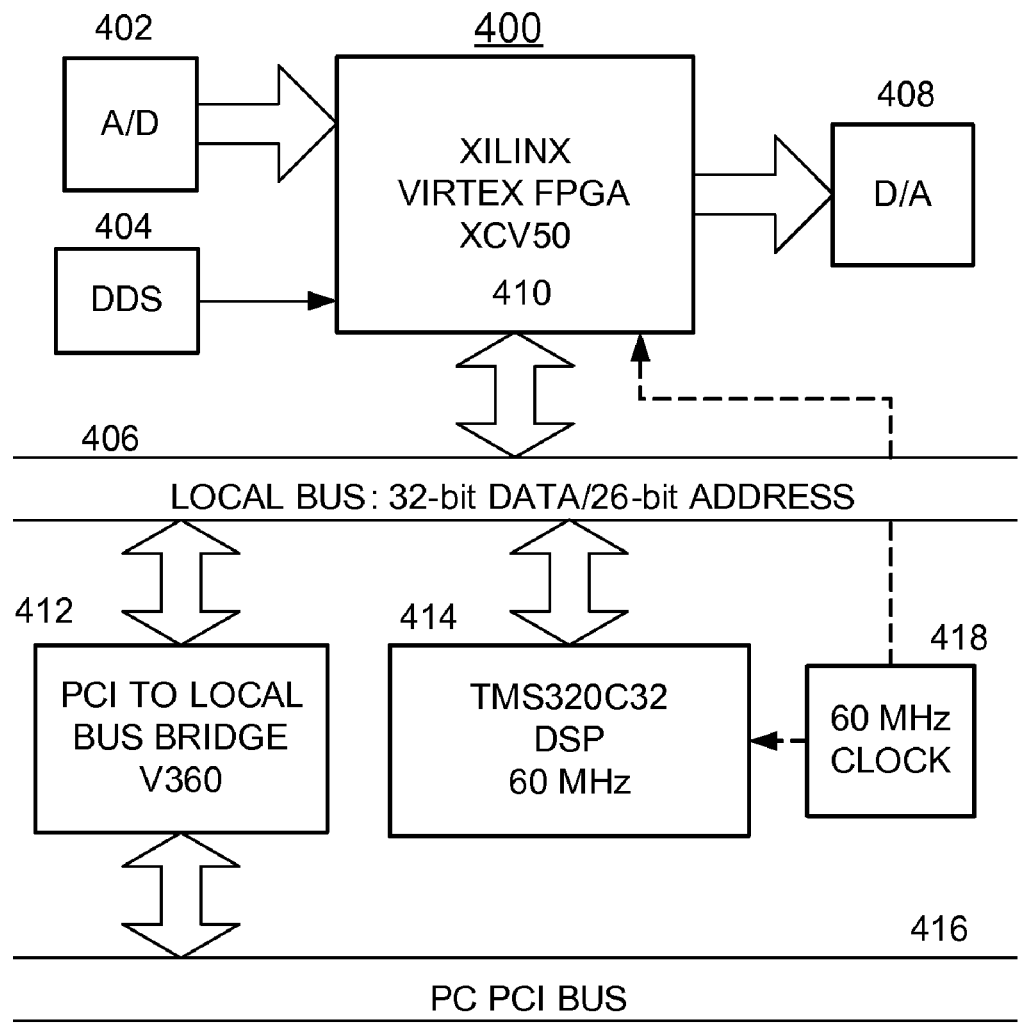
FIG. 4 is a functional block diagram of an AVR-32 Digital Signal Processor (DSP)/Field Programmable Gate Array (FPGA) system in accordance with an embodiment of the present invention.

FIG. 4 is a functional block diagram of an AVR-32, which is a Digital Signal Processor (DSP)/Field Programmable Gate Array (FPGA) system in accordance with an embodiment of the present invention.

The system 400 of FIG. 4 may be operable to generate pulses out of DAC 408 to transmitting transducer 222 of FIG. 2. In the reverse direction, sensory data from transducer 224 (FIG. 2) may be received at ADC 402. DSP 414 may be operable to process signal waveforms received at ADC 402 and generate useable data therefrom. FPGA 410 may be operable to generate pulses to be sent out DAC 408 to the drive signal input block 502 of FIG. 5, and ultimately to transmitting transducer 224 (FIG. 2). Further detail regarding system 400 is provided below.

System 400 may be configured as a PC add-in card which may include a Texas Instruments TMS320C32 Digital Signal Processor (DSP) 414, a Xilinx Virtex Field Programmable Gate Array (FPGA) 410, and/or a PCI to local bus bridge 412. The primary input/output communication circuitry may include a 12-bit, 3 MSPS A/D converter 402, and/or a 12-bit, 25 MSPS D/A converter 408. The configuration of the Virtex FPGA XCV50 410 may determine the interaction of the A/D 402 and D/A 408 with the local bus 406. The sampling rates of the A/D 402 and D/A converters 408 can be set by the onboard programmable Direct Digital Synthesizer (DDS) 404 or the 60 MHz system clock 418. System 400 may further include PC PCI bus 416.

In one embodiment, the LTP drive signals are synthesized through a combination use of the DSP 414 and FPGA 410 so as to achieve high temporal resolution and design flexibility. To generate the LTP drive signal, the FPGA 410 may be configured as a 12-bit register module pre-loaded with the corresponding binary values of each pulse level to drive the D/A converter 408. A VHDL and schematic mixed design entry is used to generated the configuration file for the FPGA 410. VHDL is a hardware description language for very high speed integrated circuits. VHDL may be used to describe electronic systems without any dependency on implementation. In the design of the LTP drive signal, the entire circuit is divided into sub-circuit modules. The I/Os and behaviors of each sub-circuit module may be defined and described by VHDL codes. The design entry is completed by wiring each module together to form the top-level schematic. The VHDL codes and schematic are compiled to generate a netlist via synthesis software. The design is followed by place and route process, which involves mapping the logical structures, described in the netlist, onto actual macrocells, interconnections, and I/O pins. Upon completion of the design processes, a bitstream for the Virtex FPGA chip 410 is generated and can be loaded into the chip to configure interconnects so that it performs the designed function. At run-time, the timing information such as the desired pulse period, duty cycle, and pulse location, is loaded into the FPGA 410 via a C program running on a host PC. With the system clocked at the fixed 60 MHz, the LTP drive signal is periodically generated through the D/A converter 408 output. Once a design is selected the DSP/FPGA combination 400 can be replaced with a simple, low cost sequential logic circuit as is known to those having ordinary skill in the art.

As shown in FIG. 1, the robot may carry the Rx/Tx transducer pair horizontally along the x-direction over locations 1 to 5 at a nominal vertical distance of 58 mm to the base plate. The objective is to evaluate the quality of the echoes from locations 1 to 5 and to determine the surface features based on the echoes. Particular attention is directed to location 4 where the depth and width of the u-shaped channel are measured. In all cases, the flight time (acoustic signal travel time) based on locking on the appropriate amplitude peak of the received signal is calculated to yield the distance estimate.

Figure 5:
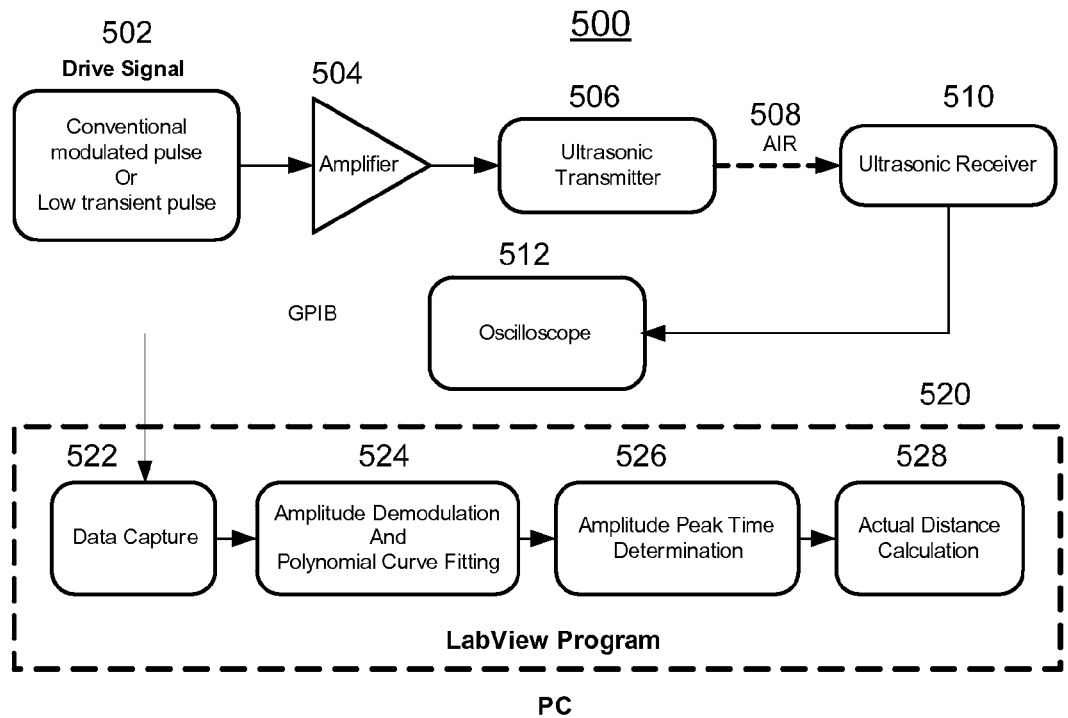
FIG. 5 is a block diagram of the signal flow and data processing for a pressure-wave based measurement system in accordance with an embodiment of the invention.

FIG. 5 shows the signal flow and data processing of a pressure-wave based measurement system in accordance with an embodiment of the present invention. The devices and operations of FIG. 5 may include drive signal 502, amplifier 504, ultrasonic transmitter 506, a transmission medium 508, which may be air, ultrasonic receiver 510, oscilloscope 512, and personal computer 520 which may run suitable software for processing received signal data, such as, but not limited to the Labview program. The operations performed within personal computer 520 may include data capture 522, demodulation and curve fitting 524, amplitude peak time determination 526, and/or distance calculations 528.

In one embodiment, the received echoes are captured 522 and stored by a LabView program through a GPIB (General Purpose Bus Interface) between the oscilloscope 512 and computer 520. The captured signal may then be amplitude demodulated and curve fitted 524 to estimate the target distance.

To capture the transducers' characteristics up to the first resonant frequency, the transmitter and the receiver can be approximated by second order transfer functions $G_{Tx}(s)$ and $G_{Rx}(s)$ as follows.

$$G_{Tx}(s) = \frac{\alpha_{Tx}s}{s^2 + 2\zeta_{Tx}\omega_{Tx}s + \omega_{Tx}^2} \quad (1)$$

$$= \frac{1800s}{s^2 + 4799.1s + 6.3799 \times 10^{10}}$$

$$G_{Rx}(s) = \frac{\alpha_{Rx}s}{s^2 + 2\zeta_{Rx}\omega_{Rx}s + \omega_{Rx}^2} \quad (2)$$

$$= \frac{1000s}{s^2 + 7639.2s + 6.4841 \times 10^{10}}$$

where $\alpha_{Tx}$, $\zeta_{Tx}$, and $\omega_{Tx}$ are the gain factor, the damping factor, and the natural frequency, respectively, of a given transmitter. A transmitter having the following values of the above-listed characteristics is considered herein: $\alpha_{Tx}$=1800 (non-dimensional), $\zeta_{Tx}$=0.0095 (non-dimensional), and $\omega_{Tx}$=2.5258×10$^5$ radians/second. For the receiver, the gain factor $\alpha_{Rx}$, damping factor $\zeta_{Rx}$, and natural frequency $\omega_{Rx}$ are given as: $\alpha_{Rx}$=1000, $\zeta_{Rx}$=0.015, and $\omega_{Rx}$=2.5464×10$^5$ radians/second. A more detailed modeling method that accounts for secondary piezoelectric effects is described in [Hayward et al. 1984 (R9)]. For the purpose being pursued herein, modeling up to the first resonance (first resonant frequency) is sufficient.

For a second order system with the transfer function $$G(s) = \frac{\alpha s}{s^2 + 2\zeta\omega_n s + \omega_n^2} \quad (3)$$

the quality factor (Q) is defined by $$Q = \frac{\omega_n}{\Delta\omega} = \frac{1}{2\zeta} \quad (4)$$

where $\alpha$, $\zeta$, $\omega_n$, and $\Delta\omega$ denote the gain factor, damping factor, natural frequency, and bandwidth for the system, respectively. The resonant frequency $\omega_r$ is related to the natural frequency $\omega_n$ by the formula $\omega_r = \omega_n \sqrt{(1-2\zeta^2)}$ The quality factor for the transmitter ($Q_{Tx}$) and the receiver ($Q_{Rx}$) are: $Q_{Tx}$=52.6316 and $Q_{Rx}$=33.3334. Due to relatively high quality factor and low control authority, pulse shaping is best achieved with feedforward algorithms.

Design of the Low Transient Pulse Drive Signal

The LTP algorithm is based on the command shaping method [Singer, 1990 (R16)] [Chang, 2003 (R5)], the teachings of which are incorporated in their entirety herein by reference, which is a feedforward technique to suppress the command-induced vibratory transients of a system. Under this scheme, the input command is preshaped by convolving it with a sequence of impulses which are predetermined according to the characteristics of a system. Ideally, the command-induced vibration is eliminated at the end of the shaper execution sequence. For the embodiments of the present invention, the objective is quite different. Specifically, it is desired to sustain the oscillation for a pre-specified number of cycles. Therefore the command shaping method is modified for LTP generation. A brief mathematical overview of the LTP design method, based on the command shaping derivations [Singer, 1990 (R16)], is presented. For simplicity, a second order system given in Equation (3) and subjected to an m-impulse excitation is considered:

$$G(s) = \frac{\alpha s}{s^2 + 2\zeta\omega_n s + \omega_n^2}$$

The unit impulse response of Equation (3) is given as:

$$y(t) = \frac{\alpha}{\sqrt{1-\zeta^2}} e^{-\zeta\omega_n(t-t_0)} \cos\left(\left(\omega_n\sqrt{1-\zeta^2}\right)(t-t_0) + \theta\right) u(t-t_0) \quad (5)$$

where $t_0$ is the impulse time, $$\theta = \tan^{-1}\left(\frac{\zeta}{\sqrt{1-\zeta^2}}\right),$$

and $u(\cdot)$ is the unit step function. Let $y_i(t)$ be the response to impulse $A_i\delta(t-t_i)$, where $A_i$ is the impulse amplitude at $t=t_i$ and $i=1, 2, \ldots, m$; then the total response is $$y(t) = \sum_{i=1}^{m} y_i(t) \quad (6)$$

where $$y_i(t) = \frac{A_i\alpha}{\sqrt{1-\zeta^2}} e^{-\zeta\omega_n(t-t_i)} \cos\left(\left(\omega_n\sqrt{1-\zeta^2}\right)(t-t_i) + \theta\right) u(t-t_i) \quad (7)$$

Let $$B_i = \frac{A_i\alpha}{\sqrt{1-\zeta^2}}$$

and $$\omega_d = \omega_n\sqrt{1-\zeta^2} \quad (8)$$

where $\omega_d$ in equation (8) is the ringing frequency.

The total response at settling time $t=t_N$ can be written as:

$$y(t_N) = \sum_{i=1}^{m} B_i e^{-\zeta\omega_n t_N} e^{\zeta\omega_n t_i} \cos(\omega_d(t_N - t_i) + \theta) \quad (9)$$

Alternatively, $$y(t_N) = e^{-\zeta\omega_n t_N} \sum_{i=1}^{m} B_i e^{\zeta\omega_n t_i} \begin{bmatrix} \cos(\omega_d t_N + \theta)\cos(\omega_d t_i) + \\ \sin(\omega_d t_N + \theta)\sin(\omega_d t_i) \end{bmatrix} \quad (10)$$

Or $$y(t_N) = e^{-\zeta\omega_n t_N} \left\{ \begin{bmatrix} \sum_{i=1}^{m} B_i e^{\zeta\omega_n t_i} \cos(\omega_d t_i) \end{bmatrix} \cos(\varphi) + \\ \begin{bmatrix} \sum_{i=1}^{m} B_i e^{\zeta\omega_n t_i} \sin(\omega_d t_i) \end{bmatrix} \sin(\varphi) \right\} \quad (11)$$

where $\phi = \omega_d t_N + \theta$.

By eliminating the $\sin(\phi)$ and $\cos(\phi)$ terms, the residual vibration $V(\omega_n, \zeta, t_N)$ can be expressed as:

$$V(\omega_n, \zeta, t_N) = |y(t_N)| \quad (12)$$

$$= e^{-\zeta\omega_n t_N} \sqrt{\left[\sum_{i=1}^{m} B_i e^{\zeta\omega_n t_i} \cos(\omega_d t_i)\right]^2 + \left[\sum_{i=1}^{m} B_i e^{\zeta\omega_n t_i} \sin(\omega_d t_i)\right]^2},$$

for $t_N > t_1, t_2, \ldots, t_m$

Now since $V(\omega n, \zeta, t_N)$ also depends upon $A_i$ and $t_i$, for $i=1, 2, \ldots, m$, it is possible to solve for $A_i$ and $t_i$ to zero out the residual vibration.

Generalized Design of LTP Drive Signals

The general LTP drive signal design is discussed in this section, and is followed by a description of some more particular LTP drive signal designs. The generalized impulse parameters are obtained by considering the transducer up to the first resonance using a second order system given in equation (13).

$$G(s) = \frac{\alpha s}{s^2 + 2\zeta\omega_n s + \omega_n^2} \quad (13)$$

The design parameters of an m-impulse low transient pulse shaper can be obtained as follows:

$$\Delta T = \frac{n\pi}{\omega_n \sqrt{1-\zeta^2}} = \frac{n\pi}{\omega_d}, \quad M_p^n = \left(e^{-\frac{\zeta\pi}{\sqrt{1-\zeta^2}}}\right)^n, \quad n = 1, 3, 5, \ldots \quad (14)$$

$$D = (1 + M_p^n)^{m-1} \quad (15)$$
$$= a_1 + a_2 M_p^n + a_3 (M_p^n)^2 + a_4 (M_p^n)^3 + L + a_m (M_p^n)^{m-1}$$

where m is a positive integer greater than or equal to 2.

In the above, $$\frac{\pi}{\omega_d}$$

is the half ringing period of the transducer. The variable n is the number of half ringing cycles. The desired number of oscillation cycles of the acoustic signal, N, is determined by n and m given as $$N = \frac{m \times n}{2}, \quad m = 2, 3, 4, \ldots \quad (16)$$

Once n is determined, $M_p^n$ and $\Delta T$ can be readily determined either from experimental measurements of the transmitter characteristics or from the damping ratio $\zeta$ and natural frequency $\omega_n$ of the transmitter.

Generalized Design of Transmitter Optimized LTP Drive Signal

The m-impulse parameters of a transmitter optimized LTP drive signal are given as:

$$PW = \Delta T, \quad (17)$$

$$t_i = (i-1)\Delta T, \quad A_i = \frac{a_i (M_p^n)^{i-1}}{D}, \quad i = 1, 2, 3, \ldots m$$

$$t_{m+1} = m\Delta T,$$

Figure 6:
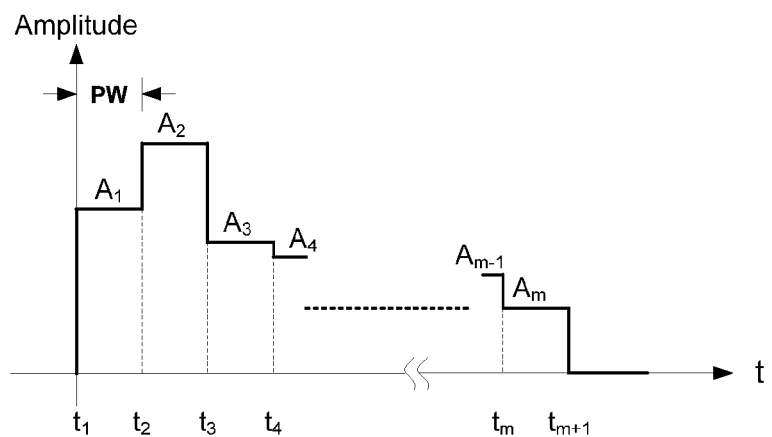
FIG. 6 is a graph of an amplitude of a generalized transmitter-optimized LTP drive signal as a function of time, in accordance with an embodiment of the invention.

FIG. 6 shows a generalized transmitter optimized LTP drive signal, in accordance with one embodiment of the invention.

Generalized Design of Transmitter-Receiver Optimized LTP Drive Signal

The m-impulse parameters of a transmitter-receiver optimized LTP drive signal are given as:

$$PW = \frac{4\Delta T}{3}, \quad (18)$$

$$t_i = (i-1)\Delta T, \quad A_i = \frac{a_i (M_p^n)^{i-1}}{D}, \quad i = 1, 2, 3, \ldots m$$

$$t'_k = t_k + \frac{\Delta T}{3}, \quad A'_k = A_{k-1} + A_k, \quad k = 2, 3, \ldots m$$

$$t_{m+1} = m\Delta T + \frac{\Delta T}{3}$$

Figure 7:
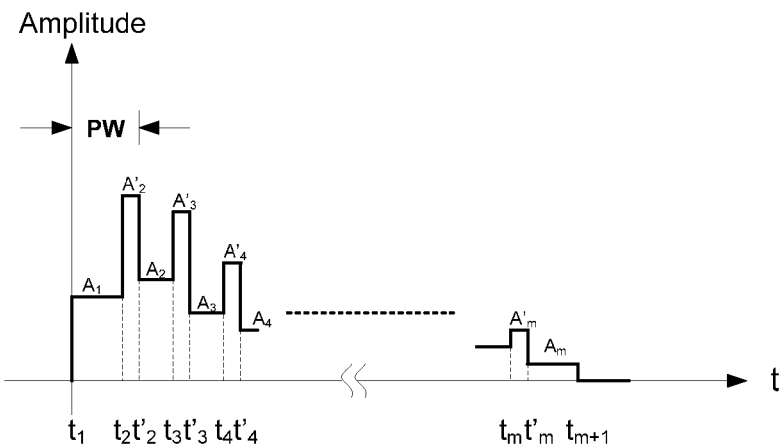
FIG. 7 is a graph of an amplitude of a generalized transmitter-receiver optimized LTP drive signal as a function of time, in accordance with an embodiment of the invention.

FIG. 7 shows a generalized transmitter-receiver optimized LTP drive signal, in accordance with one embodiment of the invention.

Two Impulse Drive Signal Design

The case where two impulses are used is now considered. In this case, where m=2, the parameters of a two-impulse LTP drive signal are obtained by setting the residual vibration Equation (12) to zero with constraints $\Sigma A_i = 1$ and $A_i > 0$ for $i=1, 2$. This gives $$B_1 e^{\zeta\omega_n t_1} \cos(\omega_d t_1) + B_2 e^{\zeta\omega_n t_2} \cos(\omega_d t_2) = 0$$

$$B_1 e^{\zeta\omega_n t_1} \sin(\omega_d t_1) + B_2 e^{\zeta\omega_n t_2} \sin(\omega_d t_2) = 0 \quad (19)$$

On substituting $$t_1 = 0, \text{ and } B_i = \frac{A_i \alpha}{\sqrt{1-\zeta^2}}$$

into Equation (19), the following equations are obtained:

$$\frac{A_1 \alpha}{\sqrt{1-\zeta^2}} + \frac{A_2 \alpha}{\sqrt{1-\zeta^2}} e^{\zeta\omega_n t_2} \cos(\omega_d t_2) = 0 \quad (20)$$

$$\frac{A_2 \alpha}{\sqrt{1-\zeta^2}} e^{\zeta\omega_n t_2} \sin(\omega_d t_2) = 0$$

where $A_1$ and $A_2$ are the impulse amplitudes that occur at time $t_1$ and $t_2$, respectively.

Since $\sin(\omega_d t_2)=0$, when $\omega_d t_2=n\pi$, therefore $$t_2 = \frac{n\pi}{\omega_d} = \frac{n\pi}{\omega_n\sqrt{1-\zeta^2}} \text{ and} \quad (21)$$

$$A_1 + A_2 e^{\frac{n\zeta\pi}{\sqrt{1-\zeta^2}}} \cos(n\pi) = 0$$

However, the choice of n=0, 2, 4, ... violates the constraint $A_i>0$, for i=1, 2 and is therefore eliminated from the solution set. For n=1, 3, 5, ..., $\cos(n\pi)=-1$, applying the same constraint $A_1+A_2=1$ into Equation (21) and solving for $A_1$ and $A_2$, the following expressions are obtained:

$$A_1 = \frac{1}{1+M_p^n} \text{ and } A_2 = \frac{M_p^n}{1+M_p^n} \quad (22)$$

where $$M_p^n = \left(e^{-\frac{\zeta\pi}{\sqrt{1-\zeta^2}}}\right)^n,$$

for n=1, 3, 5, ... Equation (22) constitutes the solution set that satisfies the constraint $A_i>0$.

With $t_1=0$, the design parameters for a two-impulse low transient pulse shaper can be summarized as follows:

$$A_1 = \frac{1}{1+M_p^n}, t_1 = 0 \quad (23)$$

$$A_2 = \frac{M_p^n}{1+M_p^n},$$

$$t_2 = \frac{n\pi}{\omega_n\sqrt{1-\zeta^2}} = \frac{n\pi}{\omega_d} = \Delta T,$$

$$M_p^n = \left(e^{-\frac{\zeta\pi}{\sqrt{1-\zeta^2}}}\right)^n, n = 1, 3, 5, ...$$

where $A_1$ and $A_2$ are the impulse amplitudes that occur at time $t_1$ and $t_2$, respectively. The variable n contributes to determining the number of oscillation cycles of the LTP acoustic signal. Since $$\frac{\pi}{\omega_d}$$

is the half ringing period, for a given n, each impulse produces n half-cycles of oscillating acoustic pressure from the transducer. The total number of oscillation cycles of the acoustic signal, N, is then determined as $$N = \frac{m \times n}{2} \quad (24)$$

where m≧2 is the number of impulses.

It is noted that $M_p$ and $$\frac{\pi}{\omega_d}$$

are the fractional overshoot and half ringing period of the transmitter response, respectively. It is noted that the period of oscillation of a transducer, in general, and the "ringing period" need not always be the same. These two quantities could differ in the case where the drive signal input into the transducer is a periodic function. Ringing oscillation is a part of the transient response of the transducer. It is produced when energy is imparted into the transducer. The ringing period is defined as $$\frac{2\pi}{\omega_d}$$

where $\omega_d=\omega_n\sqrt{1-\zeta^2}$ is the ringing frequency in radians/sec. The ringing frequency is also known as the damped natural frequency. However, when forced upon by an external driving signal, the transducer may also oscillate at the period of the driving signal, which may be different from the ringing period. Otherwise stated, when the transducer is driven by a periodic driving signal, the oscillation of the transducer may include a first frequency component arising from its own ringing frequency, and a second frequency component corresponding to the frequency of the driving signal (drive signal).

In the above discussion, and other sections herein, various equations are presented for the calculation of operating parameters such as, but not limited to: amplitudes, the amount of time separating successive impulse signals, and the duration of the impulse signals. Most preferred results may be achieved by using the exact values of such parameters obtained using the various formulae presented herein. However, the present invention is not limited to the parameter values obtained from the various equations. For instance, parameter values within selected ranges of the values obtained from the equations may be used. Such ranges may include values within +/−5% of the calculated values, within +/−10% of the calculated values, +/−15% of the calculated values, and/or within +/−20% of the calculated values, and all such variations are intended to be included within the scope of the present invention. It is believed that the use of values within the stated ranges, even if less desirable than the precise values obtained from the formulae presented herein, may nevertheless provide a considerable benefit over the performance available from the systems and methods of the prior art.

Figure 8A:
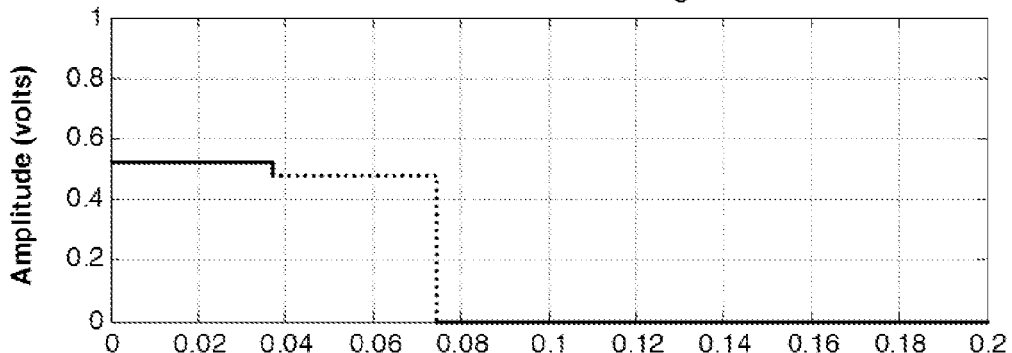
FIG. 8A is a graph of a two-pulse transmitter optimized Low Transient Pulse (LTP) drive signal in accordance with an embodiment of the present invention.
Figure 8B:
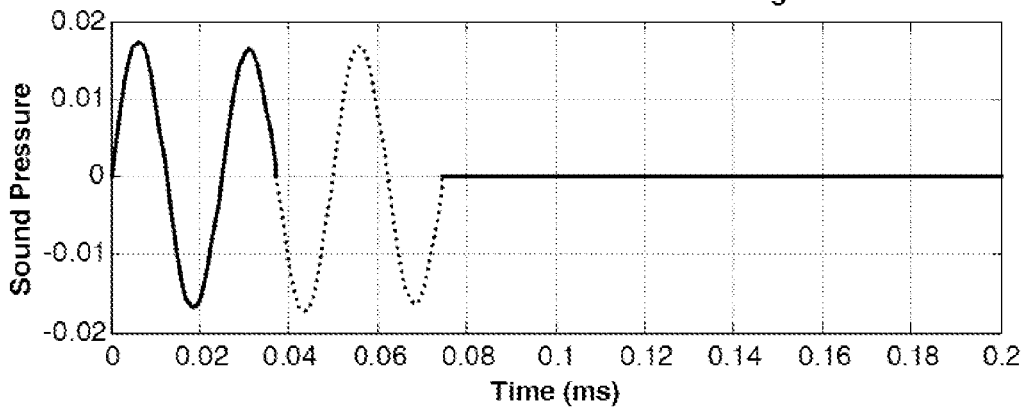
FIG. 8B is a graph of an acoustic signal emerging from a transducer that is energized by the drive signal of FIG. 6A.

A case is considered where and m=2 and n=3. Since m=2, there are two impulses. Since n=3, three half-cycles of acoustic output may generated for each impulse. The drive signal for this configuration is shown in FIG. 8A, and the acoustic output signal from the transducer generated by this drive signal is shown in FIG. 8B. The first pulse of the drive signal of FIG. 8A is shown as a solid line, and results in a corresponding solid line portion of the acoustic output signal of FIG. 8B. The second pulse of the drive signal of FIG. 8A is shown as a dashed line, and this pulse results in the corresponding dashed line portion of the acoustic output signal in FIG. 8B.

However, to produce a continuous and consistent cyclical acoustic signal at the transmitter output, there is an additional constraint on the width of the input pulse, as shown in FIG. 9, where a input pulse with pulse width PW is convolved with two impulses. The pulse width PW is preferably set to the value $t_2-t_1$ to eliminate the middle peak with amplitude ($A_1+A_2$). Eliminating this "middle peak" shown in FIG. 9C may be effective in damping unwanted acoustic signal output from the output transducer. This approach is referred to herein as a transmitter-optimized LTP drive signal. The graph shown in FIG. 9C will be revisited later in connection with the "three-level" LTP drive signal (also referred to as the transmitter-receiver optimized LTP drive signal) which may provide an acoustic output signal and a resulting receiver signal in which the transient portion of the signal energy is low.

It is noted that in other embodiments, more than two impulse signals may be employed and the number of impulse signals may be even or odd.

In summary, the two-pulse LTP drive signal synthesis steps are described as follows:

1: Based on the test requirements and hardware limitations, determine the desired oscillating cycles of the acoustic signal by setting the variable n. The variable "n" is preferably an odd number. However, in alternative embodiments, even values of "n" could be employed. In one embodiment, n is set to be greater than 1 to reduce the possibility of a distorted LTP drive signal that may occur due to hardware resolution limitations.

2: Determine the design parameters $M_p^n$ and $\Delta t$ either from experimental measurements of the transmitter characteristics or from the damping ratio $\zeta$ and natural frequency $\omega_n$ of the transmitter.

3: Set the switching time $t_2=\Delta t$, and calculate impulse amplitudes $A_1$ and $A_2$, based on equation (17).

Figure 12:
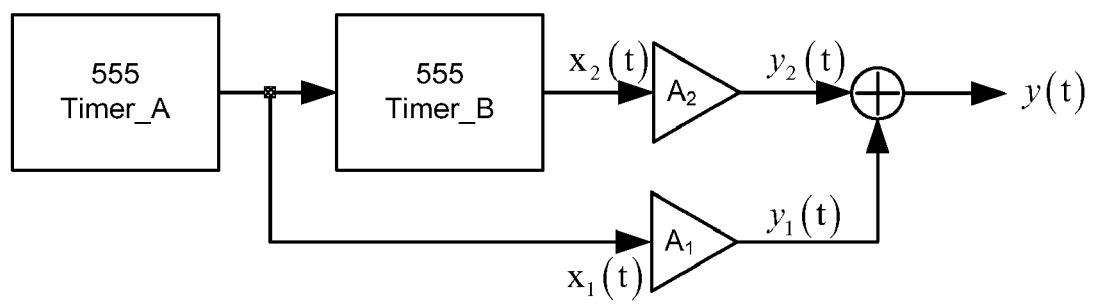
FIG. 12 is a schematic diagram of a circuit for generating a two-pulse LTP drive signal in accordance with an embodiment of the invention.

4: Set the pulse width $PW=\Delta t$. The two-pulse, transmitter-optimized LTP drive signal is now completely specified as shown in FIG. 10. Such pulse sequences can be readily generated by a low cost logic circuit, an example of which is shown in FIG. 12. It is noted that the drive signal shown in FIG. 10 operates to eliminate the "middle peak" shown in FIG. 9C. Elimination of this middle peak is preferably accomplished by setting $t_1$ to zero, and by setting $t_2$ equal to the width of the first pulse (first pulse) of the drive signal having amplitude $A_1$.

In the embodiment of FIG. 9C, the second impulse occurs before the first pulse of the drive signal (having amplitude $A_1$) concludes, thereby generating the middle peak which has an amplitude $A_1+A_2$ and which occurs between $t_2$ and $t_3$. Thus, in FIG. 9C, $t_2-t_1$ is less than the pulse width of the first pulse of the drive signal. In the embodiment of FIG. 9, this middle peak is eliminated making the value of $t_2-t_1$ equal to the pulse width of the first pulse of the drive signal, thereby avoiding having the $A_1$-amplitude pulse and the $A_2$-amplitude pulse overlap to create the $A_1+A_2$ overlap portion, referred to above as the middle peak.

An Alternative Implementation of the Two-Pulse Transmitter-Optimized LTP Drive Signal A recurring two-pulse transmitter optimized LTP drive signal is shown in FIG. 11.

FIG. 12 is a block diagram of a circuit for synthesizing a two-pulse transmitter-optimized LTP drive signal. Timer_A and Timer_B may be used to produce pulse trains. The gain of each pulse train is adjusted via the respective amplifiers A1 and A2. Amplification may be followed by summing the two amplified pulse trains to form the LTP drive signal output y(t). The circuit of FIG. 12 may be used in place of the circuit of FIG. 4 to generate one or more LTP drive signals.

Figure 13:
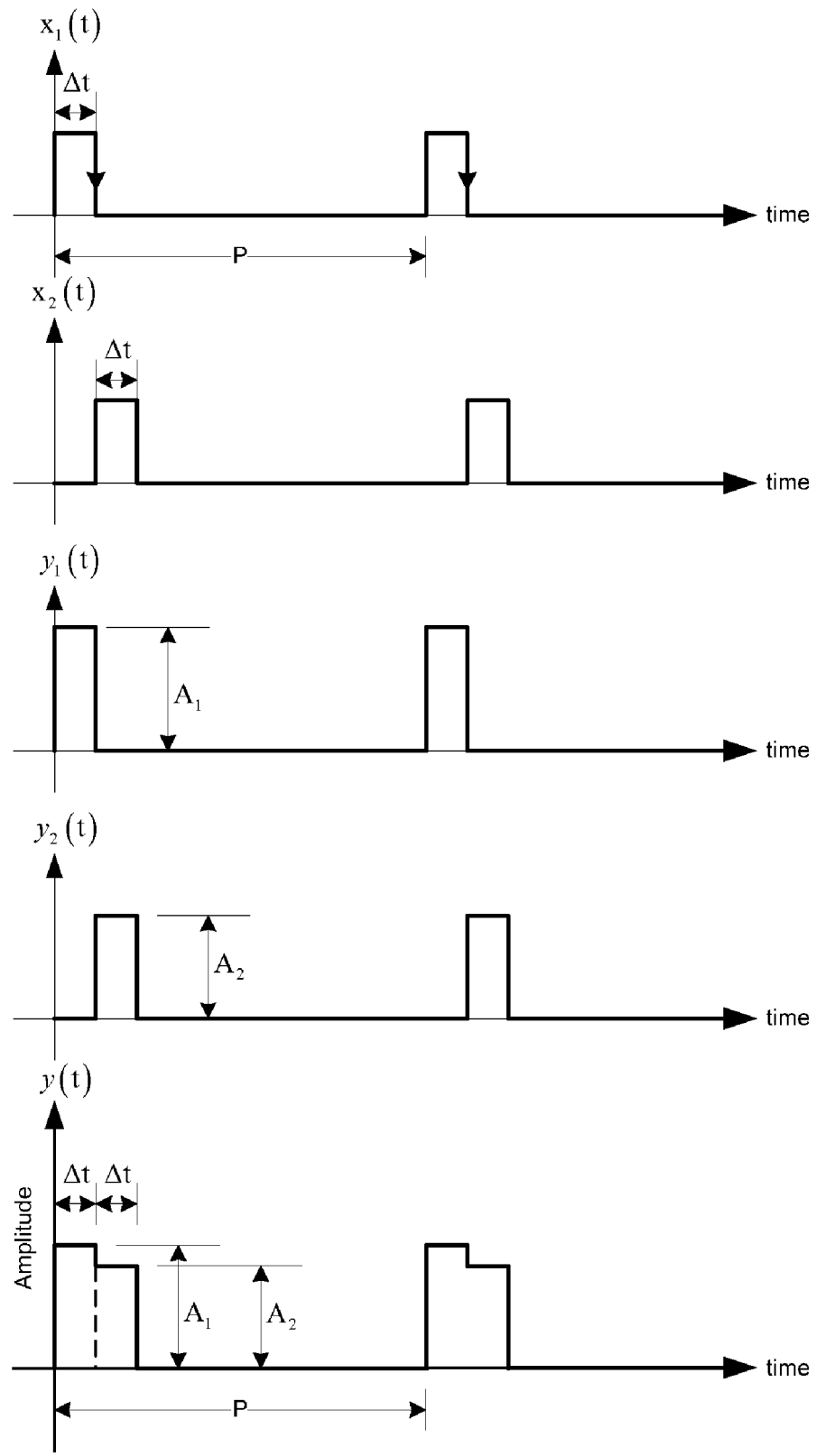
FIG. 13 illustrates the synthesis of a two-pulse LTP drive signal in accordance with an embodiment of the present invention.

FIG. 13 shows the synthesis of a two-pulse LTP drive signal. The 555 Timer_A is designed to operate in an astable mode so that a pulse train, $x_1(t)$, to provide a period P and a pulse width $\Delta t$. The pulse train $x_2(t)$ is a copy of $x_1(t)$ which is delayed by $\Delta t$, is produced by operating 555 Timer_B in a monostable mode. A pulse with pulse width $\Delta t$ is generated at each falling edge of $x_1(t)$. This results in a pulse train, $x_2(t)$, with period P and pulse width $\Delta t$. Based on the design specification of the two-pulse LTP drive signal, gain factors (amplitudes) $A_1$ and $A_2$, are applied to $x_1(t)$ and $x_2(t)$, respectively, thereby yielding signals $y_1(t)$ and $y_2(t)$, respectively. The gain adjusted signals, $y_1(t)$ and $y_2(t)$, are then summed to form the two-pulse LTP drive signal, y(t), shown at the bottom of FIG. 13.

In the following, drive signals in accordance with one or more alternative embodiments of the invention are considered.

Design of a Two-Pulse, Three-Level LTP Drive Signal

In this section, a three-level LTP drive signal is considered. The three "levels" in this section refer to the three amplitude levels of the transducer drive signal resulting from the methods described below. FIG. 9C shows such a three-level drive signal, with the three levels corresponding to the three displayed amplitudes: $A_1$, $A_2$, and $A_1+A_2$.

In some embodiments, a three-level LTP drive signal (which may be referred to herein as a transmitter-receiver optimized LTP drive signal) preferably produces a low transient pulse for both the transmitter and receiver outputs. More specifically, the pressure wave output from the transmitting transducer preferably has low transient energy content. Moreover, the resulting mechanical vibration of the receiving transducer preferably also experiences lower transient energy content. Furthermore, as a consequence of the reduced transient content of the vibration of the receiving transducer, the signal output from the receiving transducer preferably also experiences a reduction in transient energy.

The reduced transient energy at the receiving transducer may be achieved by properly selecting the pulse width, so that the transients are canceled at the receiver side. The design parameters are:

$$t_1 = 0, \qquad (25)$$

$$M_p^n = \left(e^{-\frac{\zeta \pi}{\sqrt{1-\zeta^2}}}\right)^n, n = 1, 3, 5, \ldots$$

$$A_1 = \frac{1}{1+M_p^n}, A_2 = \frac{M_p^n}{1+M_p^n},$$

$$t_2 = \frac{n\pi}{\omega_n\sqrt{1-\zeta^2}} = \frac{n\pi}{\omega_d},$$

$$PW = \frac{4t_2}{3},$$

$$t_3 = PW,$$

$$t_4 = \frac{7t_2}{3}$$

A three-level drive signal is shown in FIG. 9C. The following discussion is presented to correlate the above expressions to the labels present in FIG. 9C. Even though the value $t_1$ is not located at the origin of the graph in FIG. 9C, $t_1$ is set to zero for the above algorithm. A first pulse of the drive signal has an amplitude of $A_1$, starts at time $t_1$, and ends at time $t_3$. A second pulse of the drive signal has an amplitude of $A_2$, starts at time $t_2$ and ends at time $t_4$. However, in contrast to the embodiment shown in FIG. 10 (discussed earlier), the timing of the two drive signal pulses is selected to cause the two pulses to overlap for a limited period, specifically the period between $t_2$ and $t_3$. This overlap preferably provides the three levels (three signal amplitudes) referred in the heading of this section. Specifically, the three (amplitude) levels are $A_1$, where only the first drive-signal pulse is active, $A_2$, where only the second drive-signal pulse is active, and $A_1+A_2$ where the two drive-signal pulses overlap.

Design of a Single-Pulse LTP Drive Signal

Figure 14:
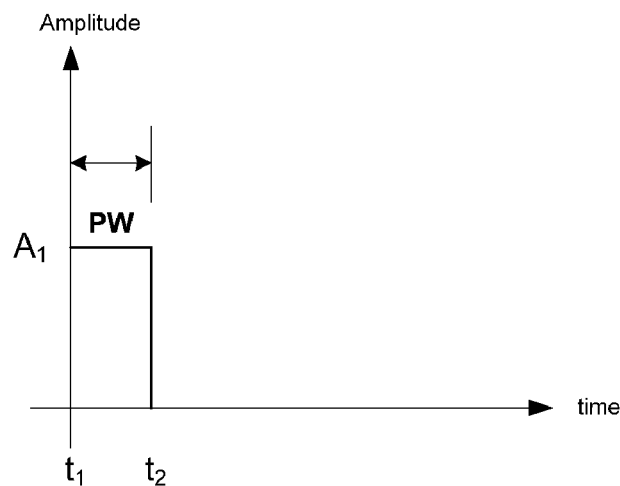
FIG. 14 is a graph of a single-pulse LTP drive signal in accordance with an embodiment of the present invention.

FIG. 14 is a graph of a single-pulse LTP drive signal in accordance with an embodiment of the present invention. The single-pulse LTP drive signal may be referred to herein as a basic LTP drive signal.

A single-pulse LTP drive signal may be considered to be a special case of the design algorithm discussed above. The single-pulse LTP drive signal may be formed by setting the parameters shown in Eq. (23) to the following values.

$$t_1 = 0, \quad (26)$$
$$A_1 = 1, A_2 = 0,$$
$$PW = t_2 = k\frac{2\pi}{\omega_d}, k = 1, 2, 3, \ldots$$

The performance of a single-pulse LTP drive signal depends on the damping of the ultrasonic transducer. Generally, the lower the damping, the higher the performance. A typical single-pulse LTP drive signal is shown in FIG. 14. In this embodiment, the value of $t_2$ is preferably set to a value that is operable to significantly reduce the duration and amplitude of transient signals in an acoustic signal output from a transducer, although not necessarily to the extent achieved discussed above in connection with the two-pulse embodiments.

Alternative Input Signal Types

In portions of the foregoing discussion, a rectangular pulse was used as exemplary LTP input command signal, as is shown in FIG. 9A. In the example of FIG. 9, this input command signal was convolved with a plurality of impulse signals to generate a resulting drive signal.

However, other signal types may be employed as input command signals, which may include but which are not limited to: triangular functions, raised cosine functions, Gaussian functions, among other signal types. As with the rectangular pulse of FIG. 9A, such alternative input command signals may be convolved with suitably timed impulse signals to produce a resulting drive signal.

Figure 15:
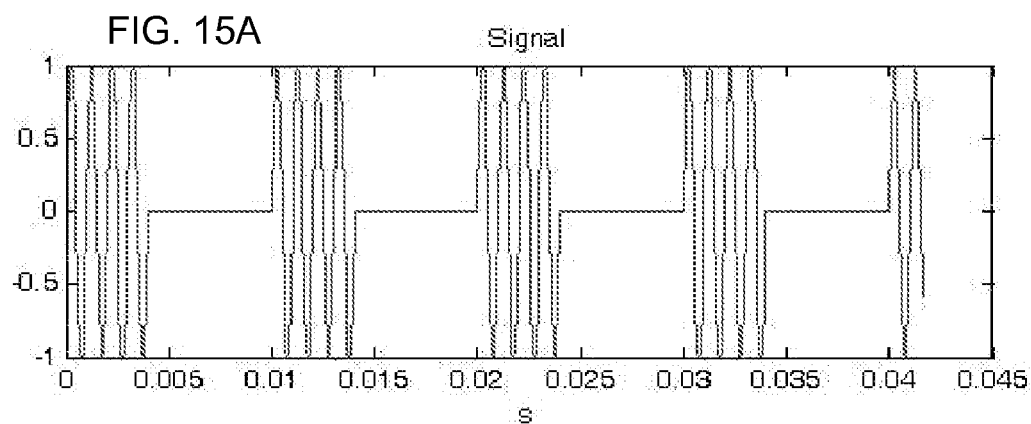
FIG. 15A is a time domain graph of a shaped rectangular signal that may be used as an input command signal in accordance with an alternative embodiment of the present invention.
FIG. 15B is a frequency domain graph of the function of FIG. 15A.
Figure 15:
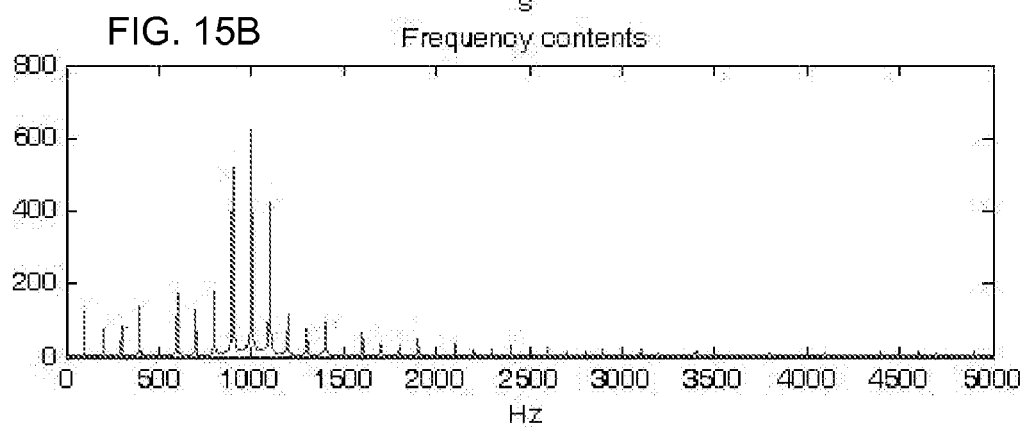

Input command signals may be selected based on the spectral characteristics thereof. For example, a rectangular shaped pulse shown in FIG. 15A produces two sidebands along with the carrier frequency, as shown in FIG. 15B. Alternatively, a sinusoidal shaped pulse as shown in FIG. 16A may have significantly richer harmonic content, as shown in FIG. 16B. Input command signal types may therefore be selected based on which frequencies are desirable or undesirable in the frequency spectrum of the signal. The ability to shape the time and frequency domain characteristics is advantageous. It should be noted that the signals in FIGS. 15 and 16 refer to the transmitting transducer output in the form of sonic energy, such as pressure waves through gases, liquids, and/or solids.

Conditions for Experiments

Experiments were conducted using a 400 Hz pulse train with pulse width PW in the pulse shaper design. The design parameters are obtained from the transmitter transfer function in Equation (1) as $\omega_{Tx}=2.5258\times10^5$ rad/sec and $\zeta_{Tx}=0.0095$. In one embodiment n is an odd number. In one embodiment n is set to one, which results in a single cycle oscillation. In a preferred embodiment n is chosen to be greater than one. In accordance with one embodiment, for n=3, corresponding to three acoustic wave cycles, the parameters of the two-pulse transmitter optimized LTP drive signal are listed in Table

TABLE 1

Parameters of the two-pulse transmitter optimized LTP drive signal for n = 3 and m = 2.

| $M_p^3$ | $\Delta t$ (sec) | $t_2$ (sec) | $A_1$ (volts) | $A_2$ (volts) | PW (sec) |
|---|---|---|---|---|---|
| 0.9144 | $3.7315 \times 10^{-5}$ | $3.7315 \times 10^{-5}$ | 0.5224 | 0.4776 | $3.7315 \times 10^{-5}$ |

Echo Transmission Simulation results

Figure 17B:
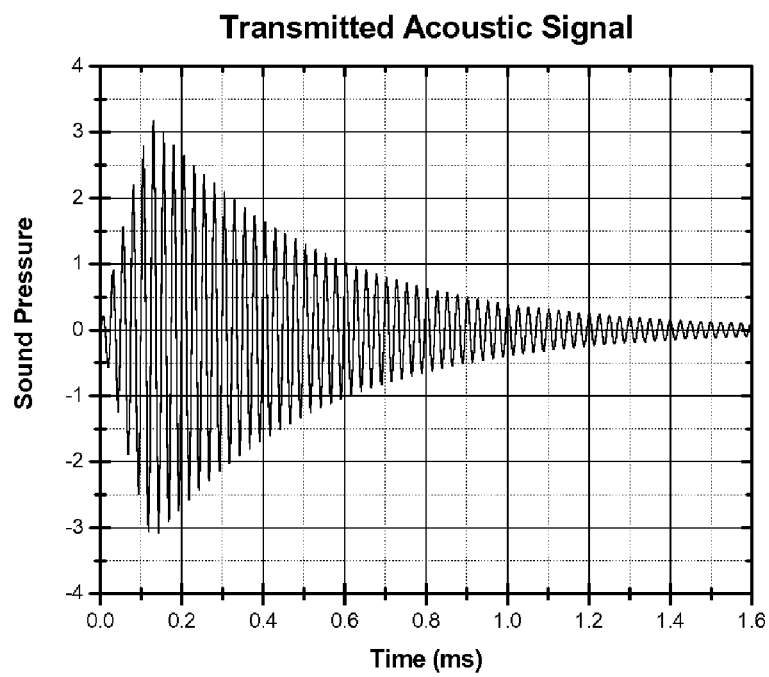
FIG. 17 includes plots of the RMP (Rectangular Modulation Pulse) drive signal (FIG. 17A) for input to a transducer, the acoustic signal transmitted from a transducer in response to the RMP drive signal (FIG. 17B); and of the voltage output of a transducer receiving the transmitted acoustic signal (FIG. 17C)
Figure 17C:
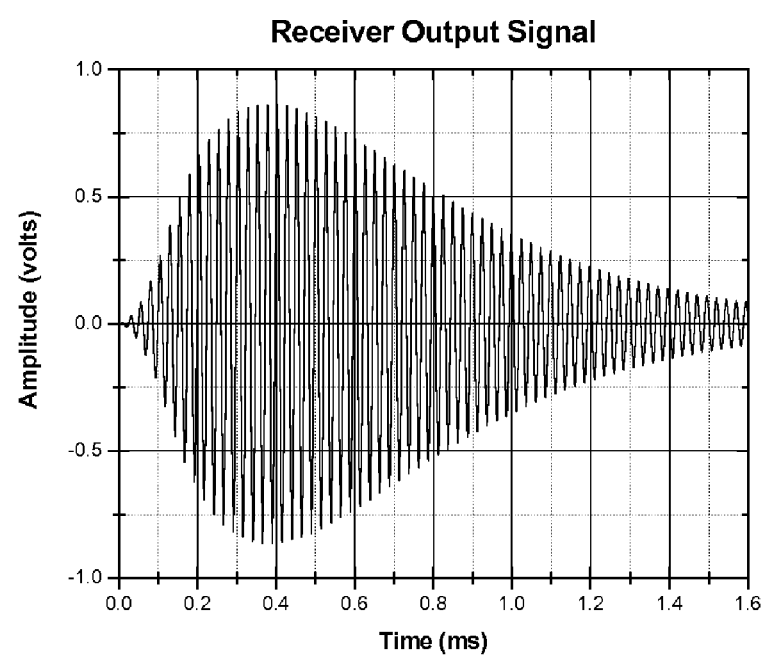
Figure 18A:
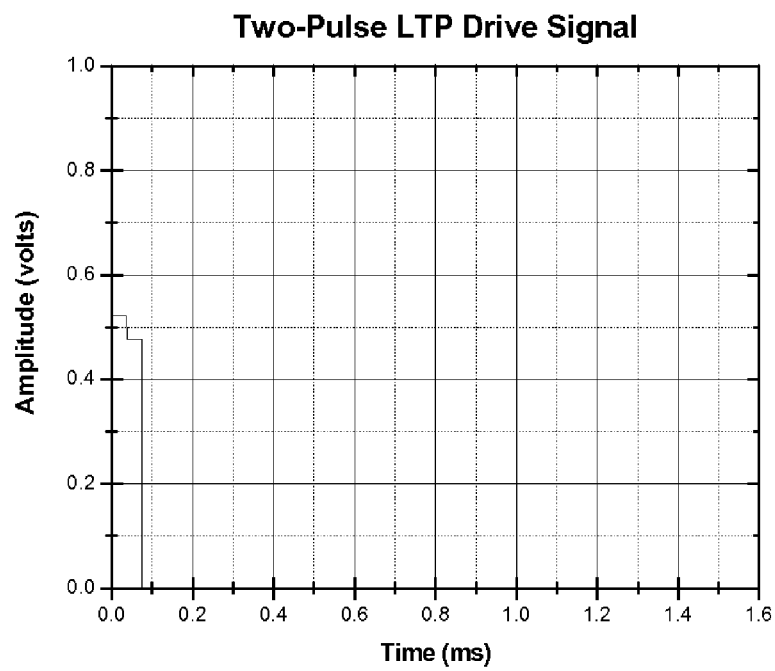
FIG. 18 includes plots of a two-pulse LTP drive signal (FIG. 18A) for input to a transducer, of the acoustic signal transmitted from a transducer in response to the LTP drive signal (FIG. 18B); and of the voltage output of a transducer receiving the transmitted acoustic signal (FIG. 18C), in accordance with an embodiment of the invention.
Figure 18B:
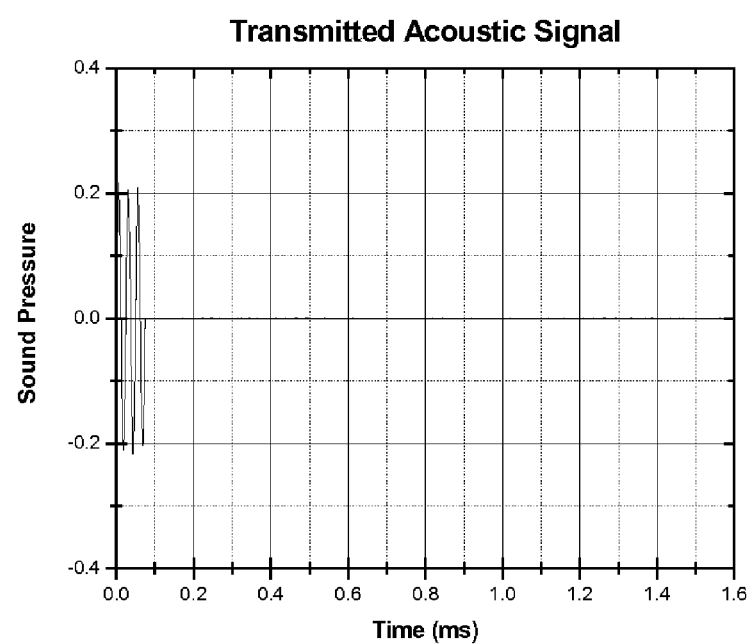
Figure 18C:
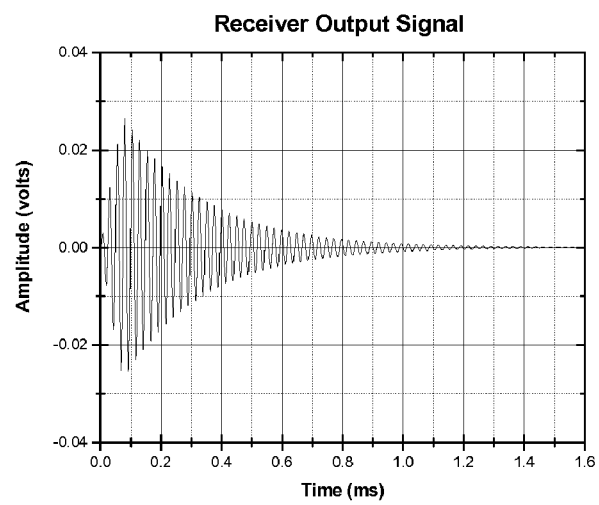

Applying the same design parameters as those in the experiments, the simulated transmitter drive, acoustic, and receiver signals are shown in FIGS. 17-18. The RMP drive and acoustic signals are depicted in FIG. 17, while the LTP drive and acoustic signals are shown in FIG. 18. For the RMP method, the excitation signal is a 400 Hz pulse train with 5% duty cycle modulated by a 40 KHz sine wave. It is evident that the acoustic signal (transmitter output) of the transducer driven by the LTP drive signal is significantly shorter than that generated using RMP excitation. The acoustic signal output has exactly 3 cycles as previously determined (see FIG. 18B).

Figure 19:
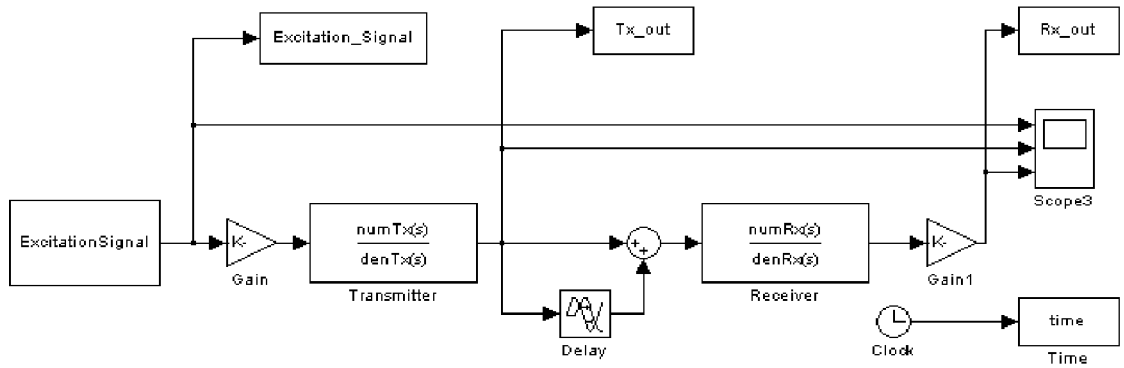
FIG. 19 is a block diagram of a system for measuring the effects of acoustic interference in accordance with an embodiment of the invention.

The next step is to compare the interference characteristics of the RMP and LTP acoustic signals at position 4 of the test platform (FIG. 1). A block diagram for a system and method for simulating the effects of varying gap depths is shown in FIG. 19. By taking the amplitude peak flight time at position 2 (FIG. 1) as the reference, various gap depths are interpreted from the delay time determined using the approach depicted in the block diagram of FIG. 19. The simulations and experiments described herein employ various values for separation distances between the transmitters/receivers and surfaces reflecting sonic energy, various delay time values among other parameters. It will be appreciated that the present invention is not limited to these specific values, and that a wide range of such values may be employed without departing from the scope of the present invention.

In the simulation, the transmitter output (acoustic signal) is injected into two separate paths: without delay and with delay (the delay block may be seen at the bottom center portion of FIG. 19). The two signals represent the echoes from the top of the solid block (positions 2 or 5 in FIG. 1) and the bottom of the gap (position 4 in FIG. 1). The presence of multiple echoes is due to edge effects as well as the acoustic beam solid angle (about 30 degrees). These two signals are combined at the receiver (Rx) and cause the amplitude peak to shift due to interference. It is of interest to compare the preservation of the actual delay time of the echoes as a function of the two transmitter drive methods.

Figure 20:
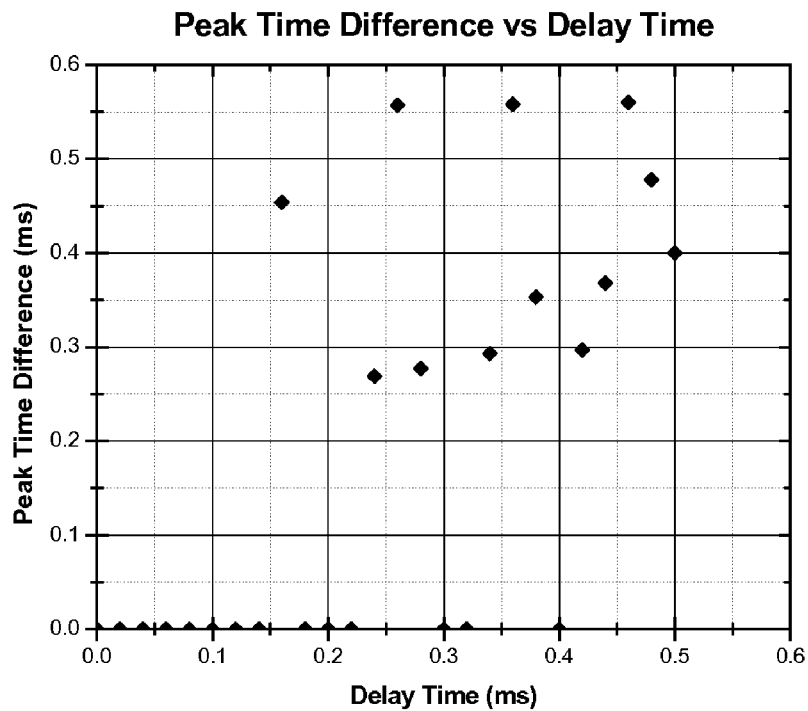
FIG. 20 is a graph of the peak time difference versus delay time for a transducer experiencing RMP excitation.
Figure 21:
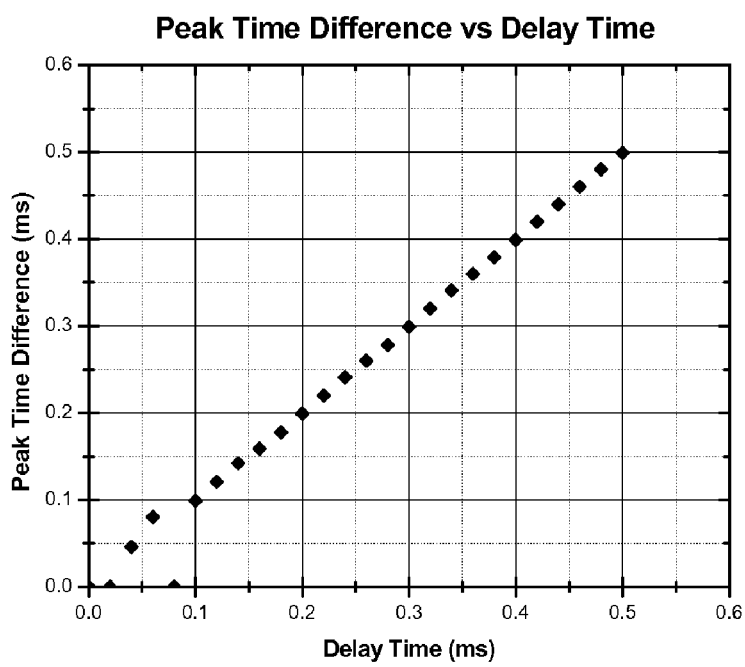
FIG. 21 is a graph of the peak time difference versus delay time for a transducer experiencing LTP excitation, in accordance with an embodiment of the present invention.

The simulation is performed with the delay time ranging from 0 ms to 0.5 ms and a step size of 0.02 ms, corresponding to a depth range of 86 mm and a resolution of 3.5 mm, assuming that the speed of sound is 343 m/s. At each step, the flight time based on the peak echo intensity (amplitude peak time) is recorded. For each delay time (hence depth change), the time difference between the first amplitude peak and the second amplitude peak indirectly indicates the measured gap depth. Simulation results are shown in FIGS. 20-21. It can be observed that the LTP excitation results in a better depth resolution than the RMP excitation. Moreover, the LTP drive signal method disclosed herein may provide a measurement resolution that is less than one wavelength of an acoustic signal generated by an LTP drive signal. For example, a round trip delay time of 0.04 ms corresponds to a depth of 6.86 mm, which is 20% shorter than the wavelength, 8.575 mm.

Echo Transmission Experimental Results

Three sets of experiments were performed on the test platform to verify the performance of the proposed LTP method: surface feature detection, effects of gap widths on acoustic measurements, and effects of gap depths on acoustic measurements.

Figure 22:
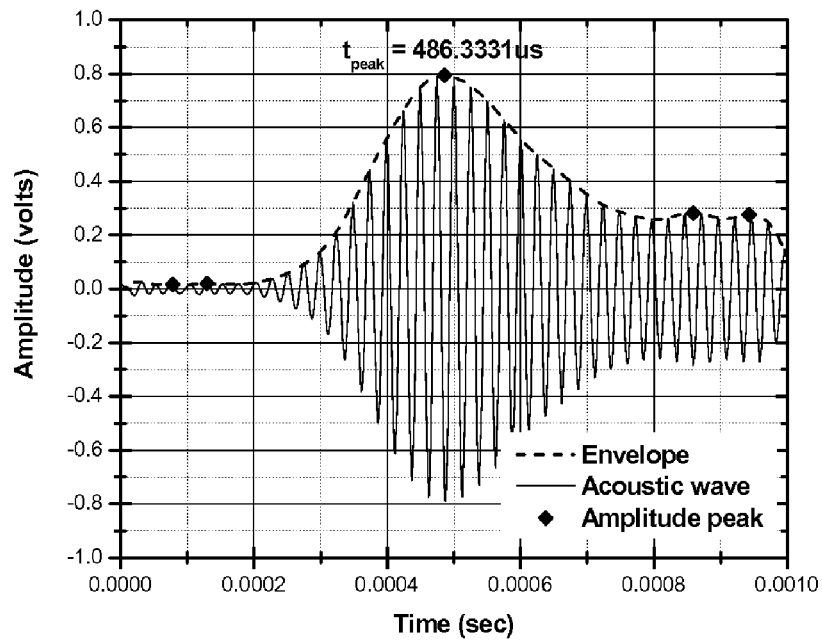
FIG. 22 is a plot of the amplitude of echo signals received from a 33 millimeter (mm) base surface employing a transducer using RMP excitation.
Figure 23:
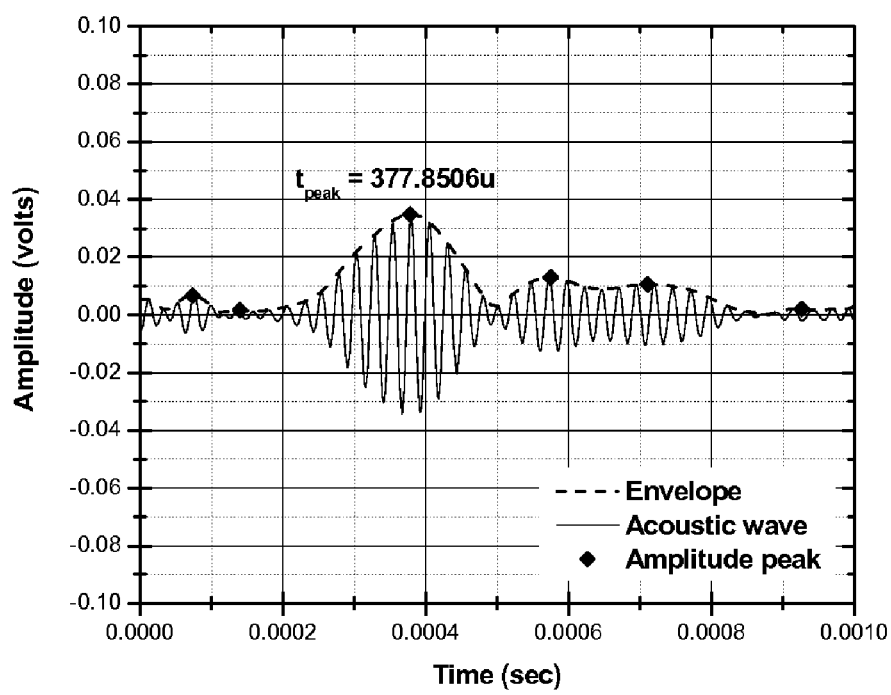
FIG. 23 is a plot of the amplitude of echo signals received from a 33 millimeter (mm) base surface employing a transducer using LTP excitation with a 3-cycle acoustic wave, in accordance with an embodiment of the present invention.

The experimental data were filtered by a rectangular windowed FFT bandpass filter with 30 KHz to 50 KHz passband. The filtered data are demodulated to obtain the signal envelope, which is then fitted by a least-square quadratic fit to determine the amplitude peaks. The filtered acoustic signals, demodulated envelopes, and the determined amplitude peaks, echoed from the 33 mm base surface, for the RMP and the 3-cycle acoustic wave LTP excitations are shown in FIGS. 22-23.

The corresponding amplitude peak time is 486.3331 µs for the RMP excitation and 377.8506 µs for the 3-cycle acoustic wave LTP excitation. Assuming sound travels in air at a constant velocity of 343 m/sec, the round-trip flight time between the transducers and the 33 mm base surface (referred to point 2 in FIG. 1), $t_{33}$ is obtained as follows.

$$t_{33} = \frac{2\sqrt{33^2 + 10^2}}{343} = 201.0605 \text{ µs} \tag{27}$$

Taking the flight time, $t_{33}$ as a reference, the time offset, caused by the transducer characteristics, can be found $$t_{RMP\text{-}offset} = 486.3331 \text{ µs} - 201.0605 \text{ µs} = 285.2726 \text{ µs}, \tag{28}$$

$$t_{LTP3\text{-}offset} = 377.8506 \text{ µs} - 201.0605 \text{ µs} = 176.7901 \text{ µs}, \tag{29}$$

where $t_{RMP\text{-}offset}$ and $t_{LTP3\text{-}offset}$ are the time offset for RMP and 3-cycle acoustic wave LTP excitations, respectively.

In the experiments, the flight time is calculated from the time of the appropriate amplitude point of the fitted curve with its corresponding time offset subtracted.

Surface Feature Detection

Figure 24:
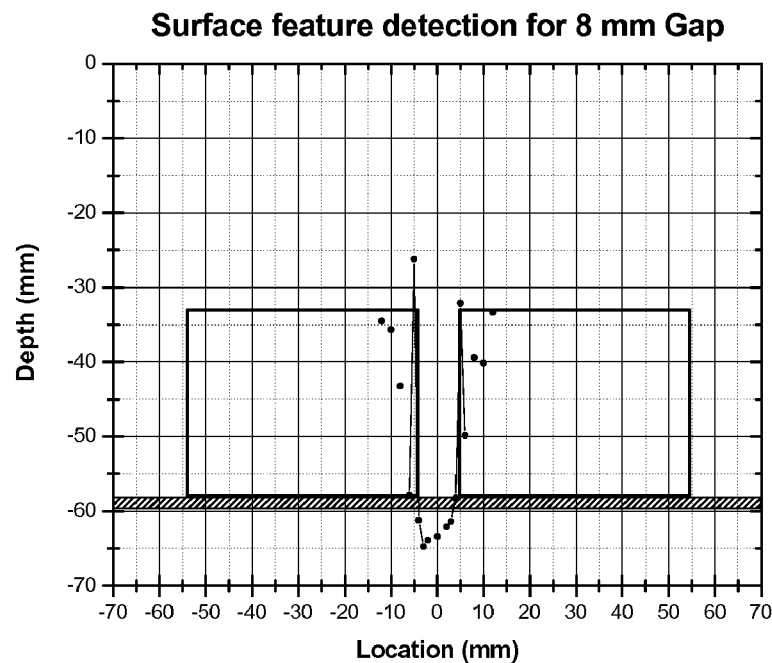
FIG. 24 is a plot of surface feature detection using an 8 mm gap and RMP excitation.
Figure 25:
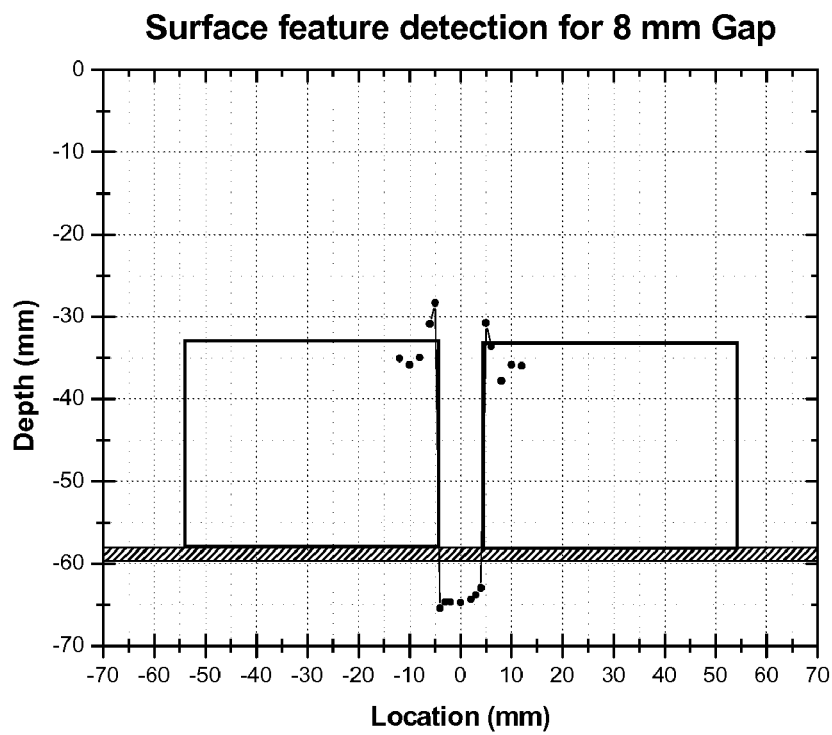
FIGS. 25-27 are plots of surface feature detection using an 8 mm gap and an LTP signal with a 7-cycle acoustic wave (FIG. 25), a 5-cycle acoustic wave (FIG. 26), and a 3-cycle acoustic wave (FIG. 27), in accordance with an embodiment of the invention.
Figure 26:
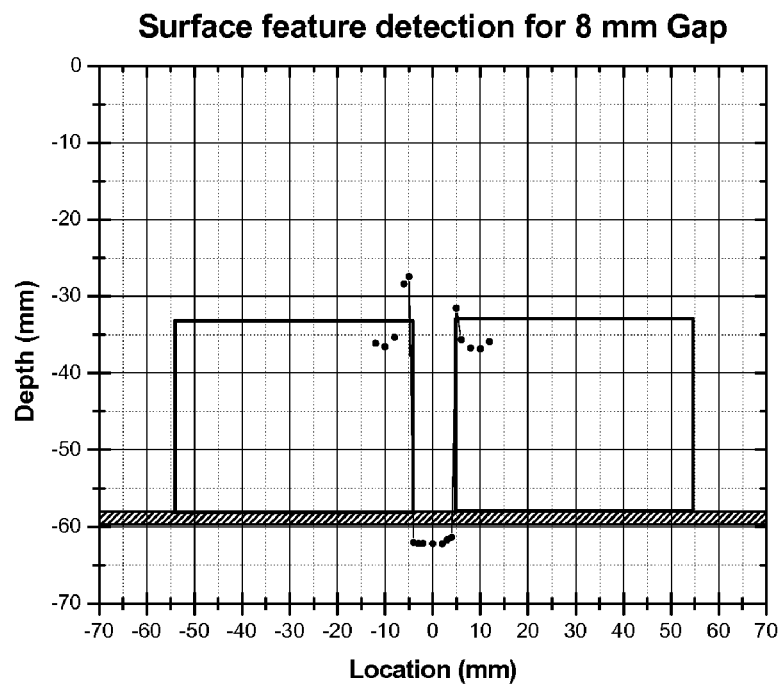
Figure 27:
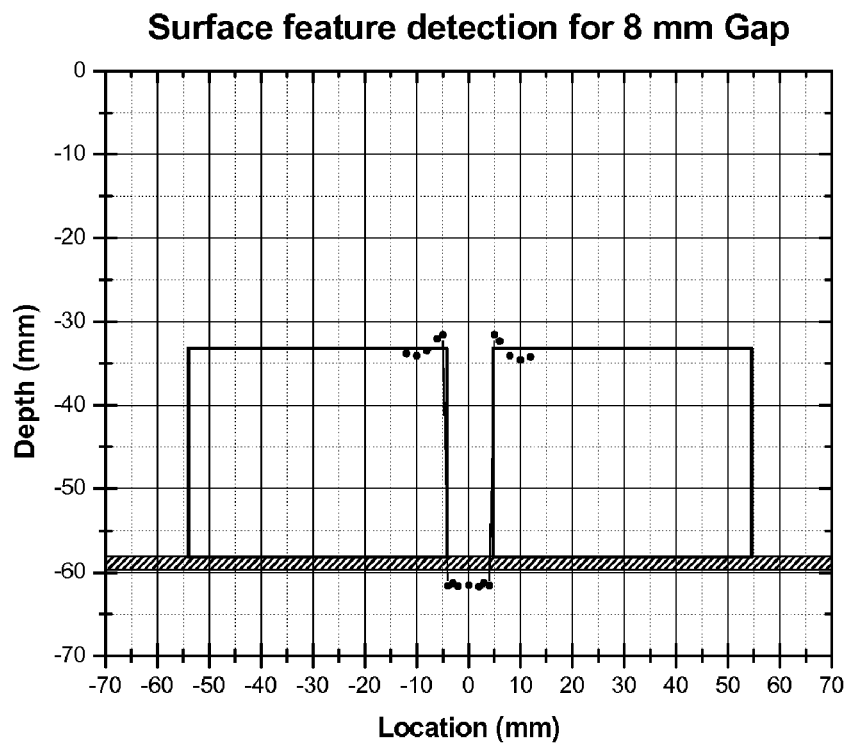

In this test, the ultrasonic ranging system scans over the test platform from point 1 to point 5 to detect the presence of the narrow channel (gap) which is set to 8 mm. For the RMP excitation, the results are shown in FIG. 24. FIGS. 25-27 show results for the LTP excitations with 7-cycle, 5-cycle and 3-cycle acoustic wave, respectively. With fewer acoustic wave cycles, the LTP produces better measurement of the target features.

Effects of Gap Widths on Acoustic Measurements

Figure 28:
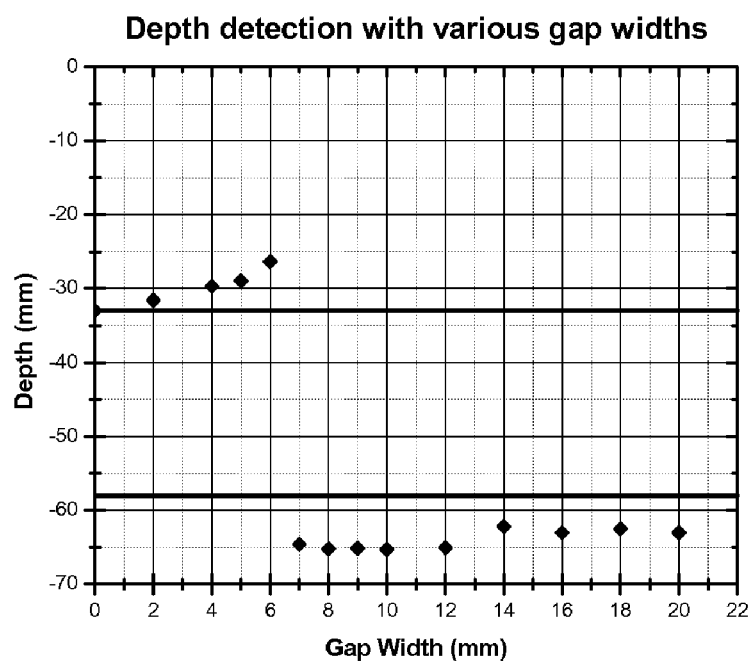
FIGS. 28-31 show experimental results for depth detection as a function of gap width using an RMP drive signal (FIG. 28), an LTP signal with a 7-cycle acoustic wave (FIG. 29), an LTP signal with a 5-cycle acoustic wave (FIG. 30), and an LTP signal with a 3-cycle acoustic wave (FIG. 31), in accordance with an embodiment of the invention.
Figure 29:
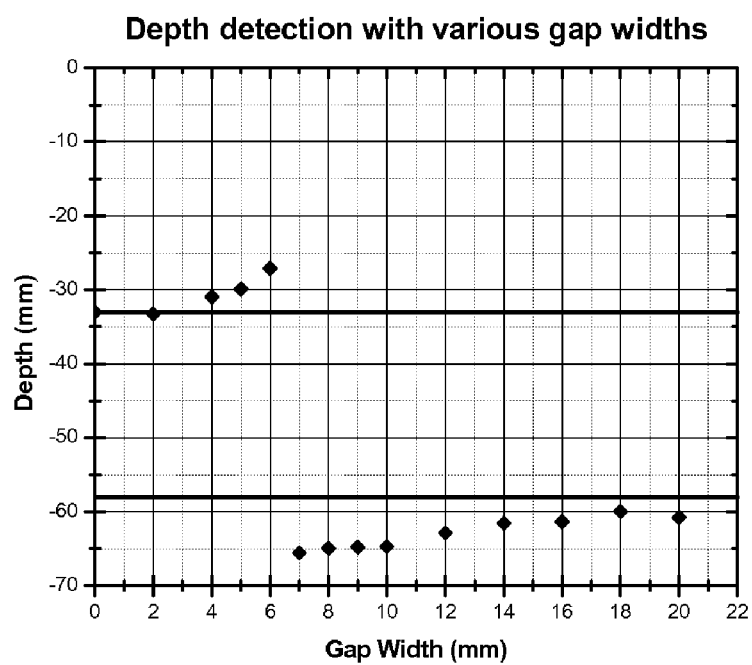
Figure 30:
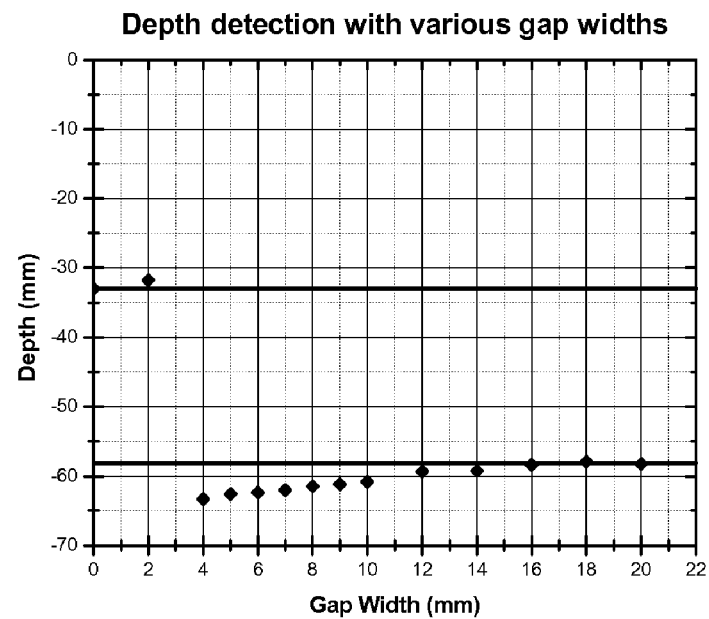
Figure 31:
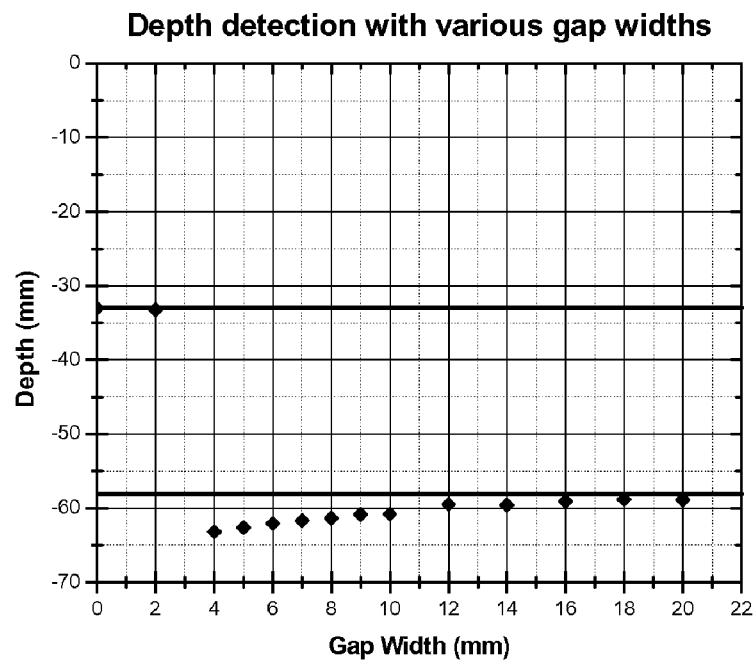
Figure 32:
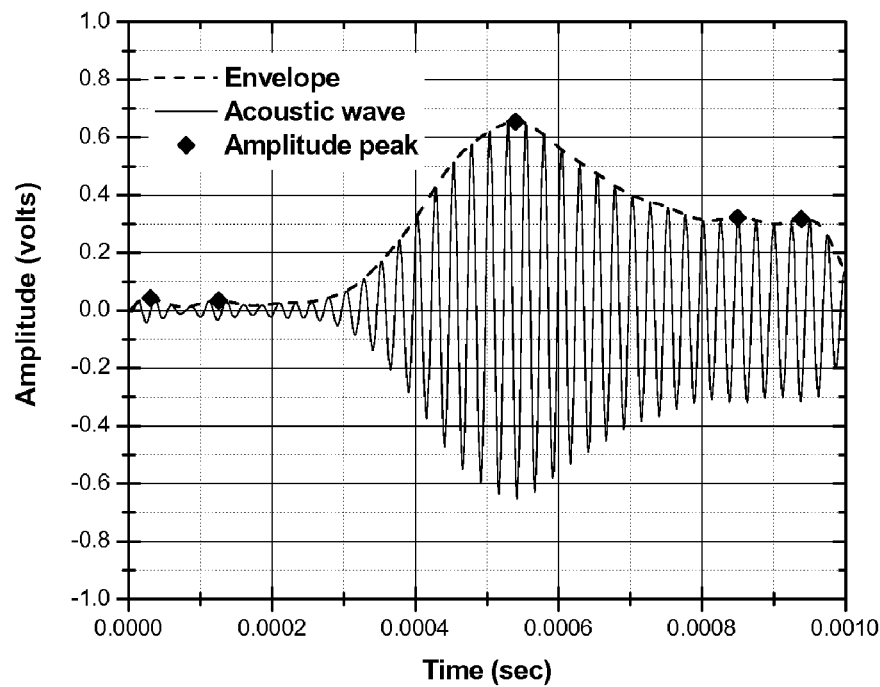
FIGS. 32-33 show echo signals received from a surface having a gap depth of 14.5 mm and a gap width of 8 mm using RMP excitation (FIG. 32), and an LTP signal using 3-cycle excitation (FIG. 33) in accordance with an embodiment of the invention.
Figure 33:
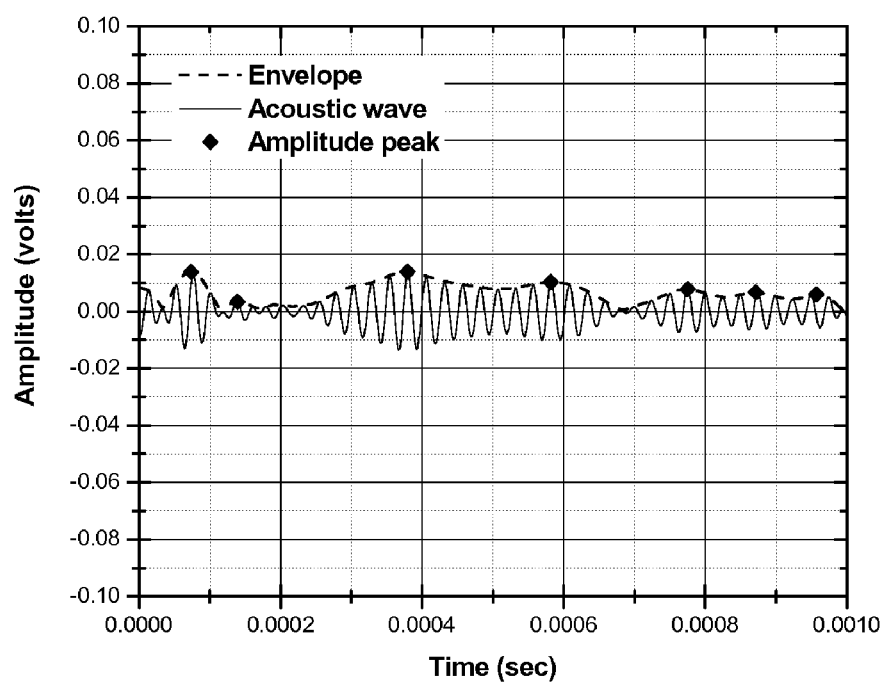
Figure 34:
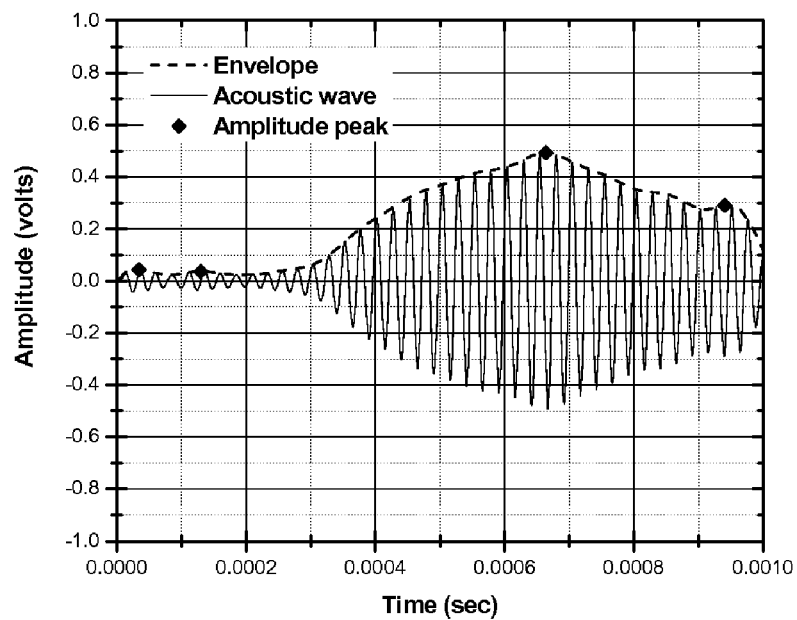
FIGS. 34-35 show echo signals received from a surface having a gap depth of 36.5 mm and a gap width of 8 mm using RMP excitation (FIG. 34), and an LTP signal using 3-cycle excitation (FIG. 35) in accordance with an embodiment of the invention.
Figure 35:
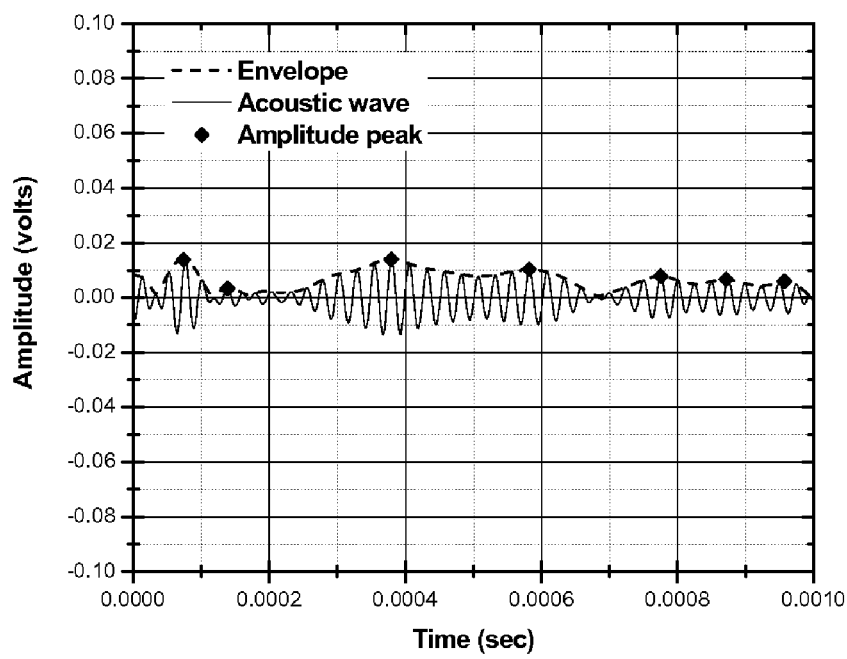

For this test, the gap depth is fixed at 25 mm so that the top and bottom of the gap are measured at 33 mm and 58 mm from the transducers. The gap width is varied from 0 mm to 20 mm for the measurements. As shown in FIG. 28, the RMP excitation results in measurement error significantly higher than the LTP excitation, in particular the 7-cycle, 5-cycle, and 3-cycle LTP drive signals, as shown in FIGS. 29, 30, 31 respectively.

Effects of Gap Depths on Acoustic Measurements

The experiment is performed by varying the gap depth from 0 mm to 50 mm using a step size of 5 mm. The 0 mm gap depth is defined from the baseline (point 2 in FIG. 1) which is located at distance of 33.0 mm from the transducer pair. Some typical test data are shown in FIGS. 32-35. For the RMP excitation, it is evident that significant acoustic interference has taken place so that the multiple echoes have effectively aliased and become inseparable. For LTP excitation, the first echo (from the baseline) and second echo (from the gap) are clearly separable.

Figure 36A:
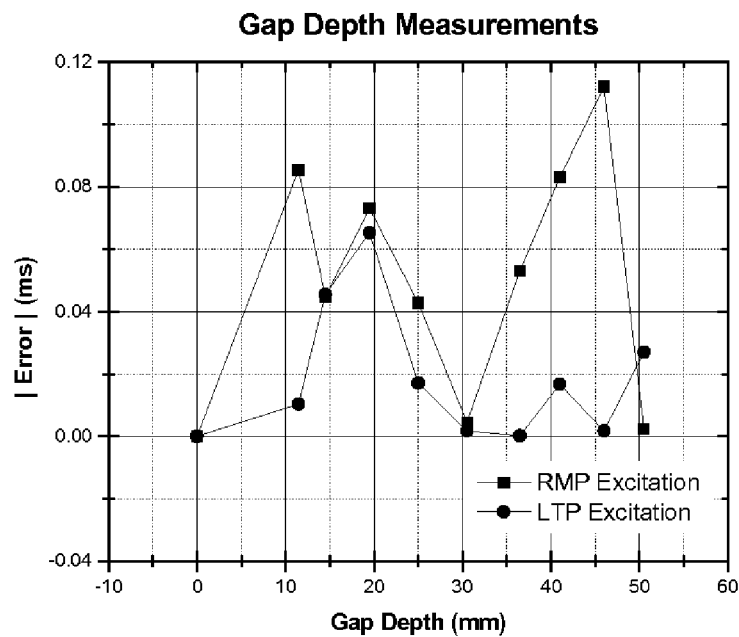
FIG. 36 shows gap depth measurements using an 8 mm gap width (FIG. 36A), a 10 mm gap width (FIG. 36B), and a 12 mm gap width (FIG. 36C), in accordance with an embodiment of the invention.
Figure 36B:
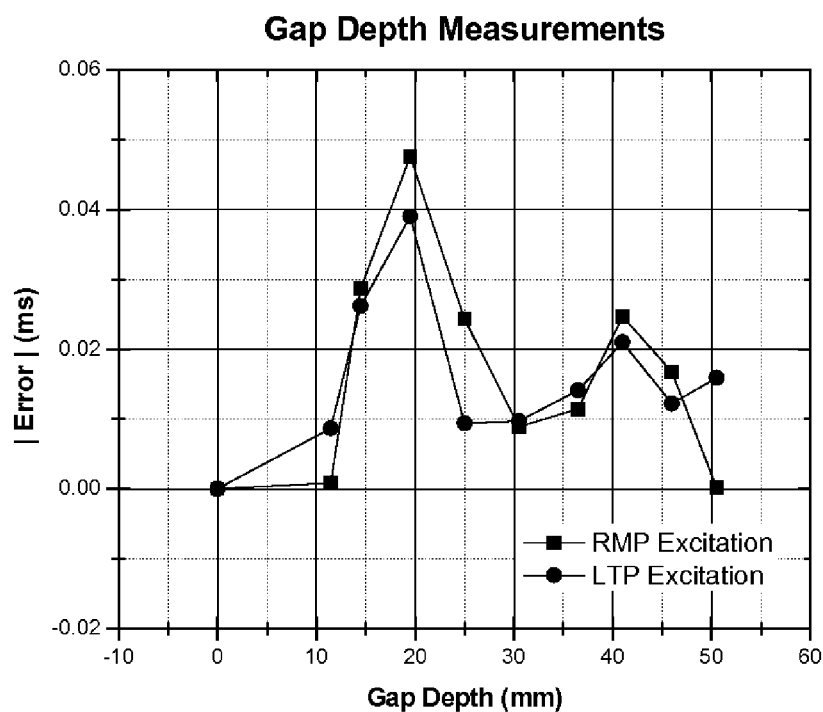
Figure 36C:
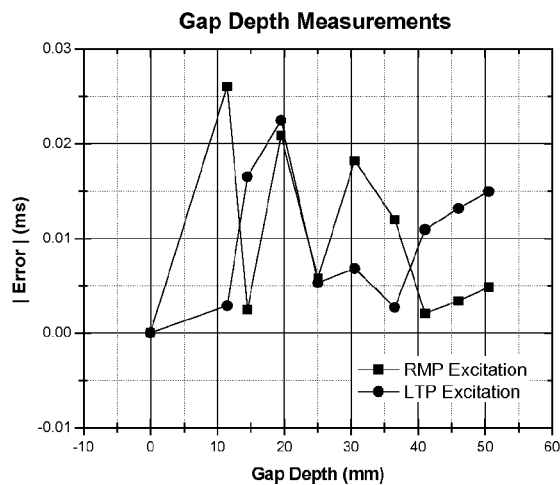

The results for measurements are summarized in FIG. 36. The experimental results indicate that within the gap width from 8 mm to 12 mm the LTP excitation produces better measurements than the RMP method. The results are also consistent with the previous two tests. For both RMP and LTP excitations, as the gap width increases, the flight time measured is close to the flight time of its corresponding baseline measurement due to there being less interference between two echoed acoustic waves.

Axial Transmission Simulation Results

To further verify the performance of the LTP drive signals, simulations based on the signal transmission configuration 3700 shown in FIG. 37 were performed. The transmitter and receiver were separated at a distance D, which was initially treated as a delay time and then applied in the simulations. In the case of D=38.5 mm, the delay times for soft tissue and bone were set to 25 µs and 9.625 µs, respectively.

In the embodiment of FIG. 37, transmitter 222 may transmit pressure waves, such as acoustic signals, axially along medium 3702, which may in turn be received at receiver 224. In FIG. 37, medium 3702 is indicated as including layers of soft tissue and bone. However, it will be appreciated medium 3702 may include one or more other materials either in place of, or in addition to, the materials shown in FIG. 37, including but not limited to: other body tissues, wood, metal, concrete, plastic, glass, and ceramic.

In general, the transmitted acoustic signals will experience changes in their properties as a consequence of being propagated along medium 3702. The nature and extent of the changes to the propagated acoustic signals may be measured by circuitry (not shown) coupled to receiver 224. Such measurements may enable calculation of one or more characteristics of medium 3702. Characteristics that may be calculated based on measurements at receiver 224 may include, but are not limited to: density, porosity, the presence or absence of fractures, material geometry along the signal propagation path, the presence of foreign articles, tumors or other medical irregularities (in the case of medical applications), degree of adhesion between two or more materials included in medium 3702.

Figure 38:
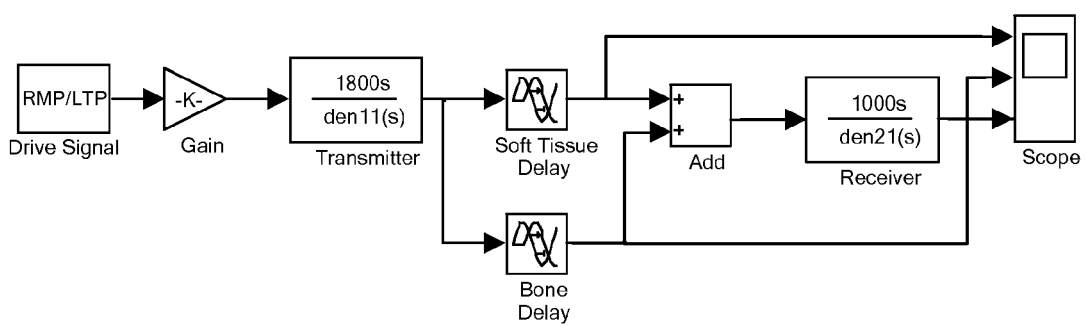
FIG. 38 is a block diagram of a system for conducting a simulated sonic scan of materials including bone and/or soft tissue in accordance with an embodiment of the invention.
Figure 39A:
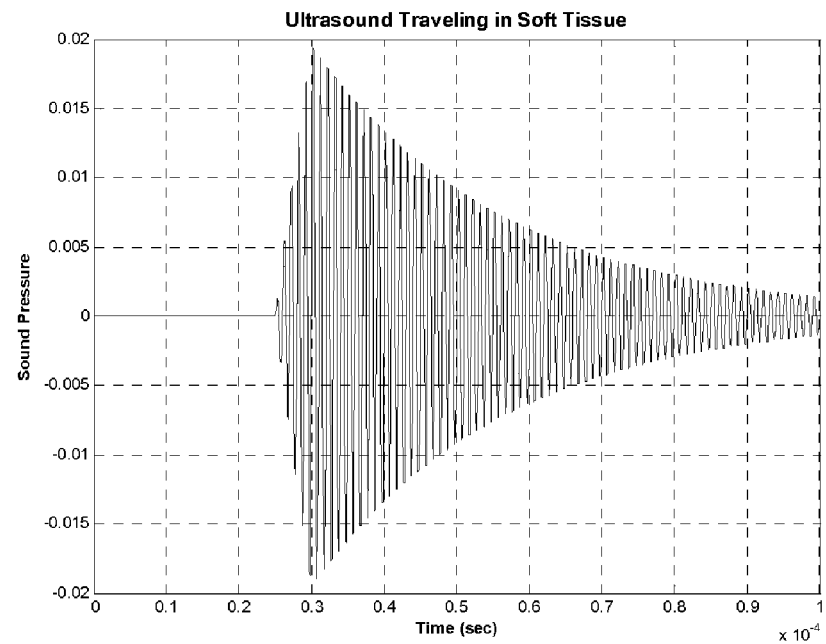
FIG. 39 includes plots of interference of RMP sonic wave pressure, in units of Pascals, as a function of time for propagation through soft tissue (FIG. 39A), through bone (FIG. 39B), and a combination bone and soft tissue (FIG. 39C), in accordance with an embodiment of the invention.
Figure 39B:
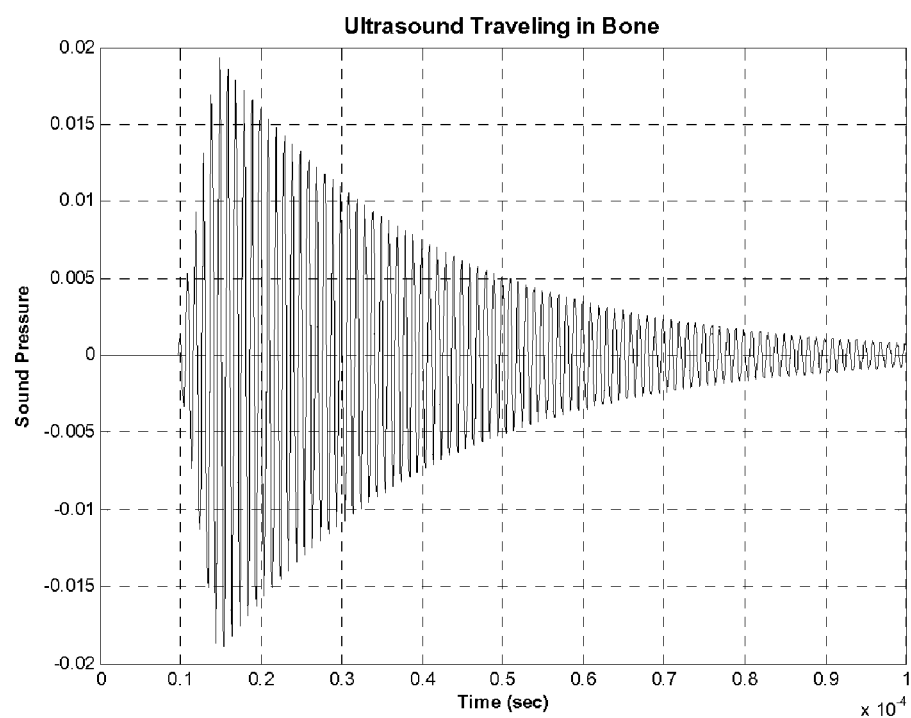
Figure 39C:
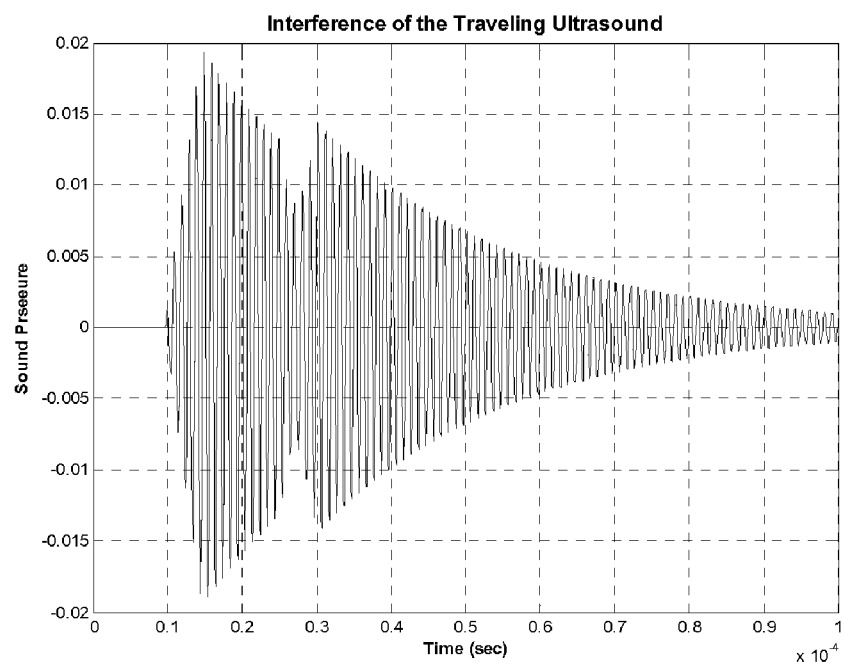
Figure 40A:
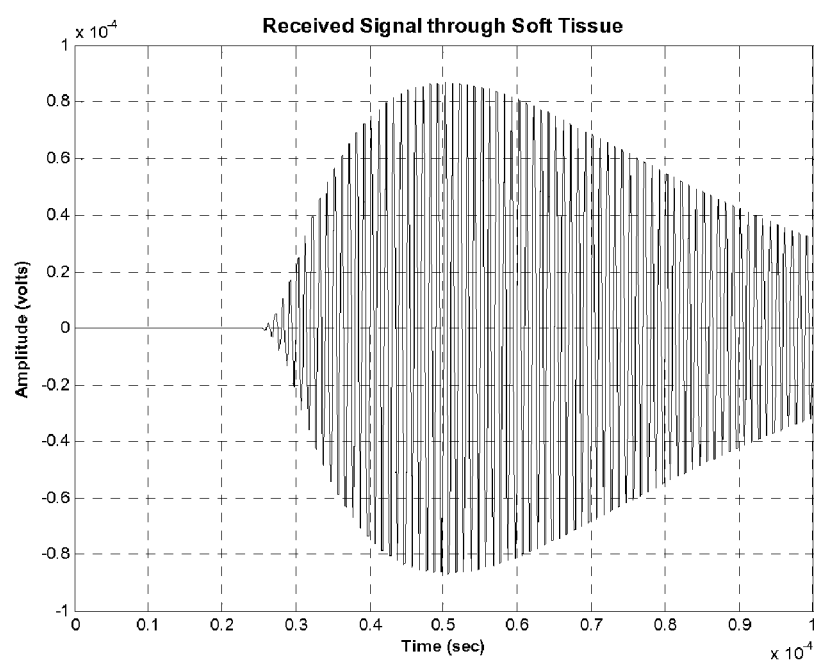
FIG. 40 includes plots of signals received at a receiver that have traveled through soft tissue (FIG. 40A), through bone (FIG. 40B), and through a combination bone and soft tissue (FIG. 40C), in accordance with an embodiment of the invention.
Figure 40B:
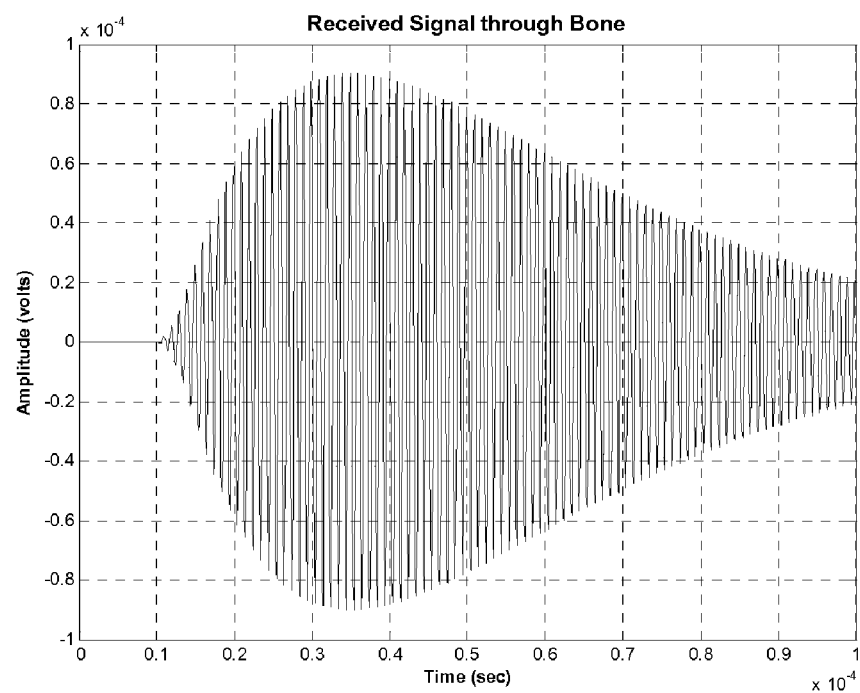
Figure 40C:
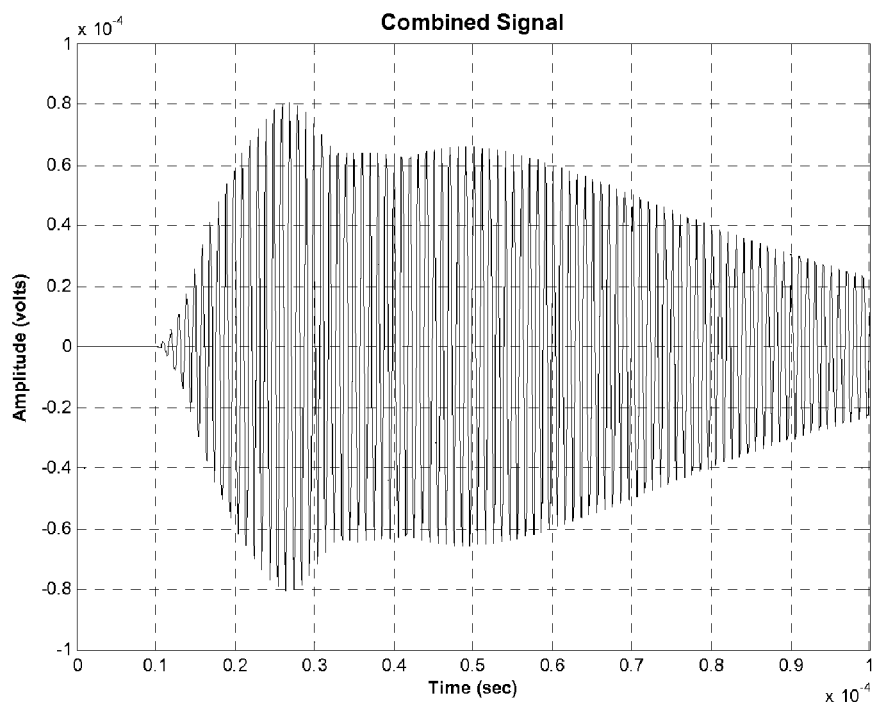
Figure 41:
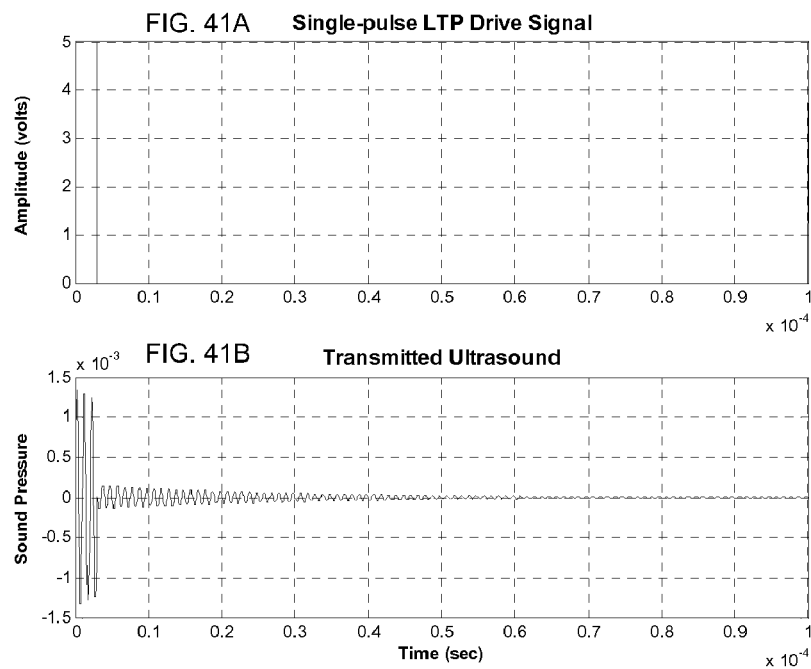
FIG. 41A is a plot of a single-pulse LTP drive signal (basic signal)
FIG. 41B is a plot of a transmitted sonic signal resulting from the drive signal of FIG. 41A, in accordance with an embodiment of the invention.
Figure 42A:
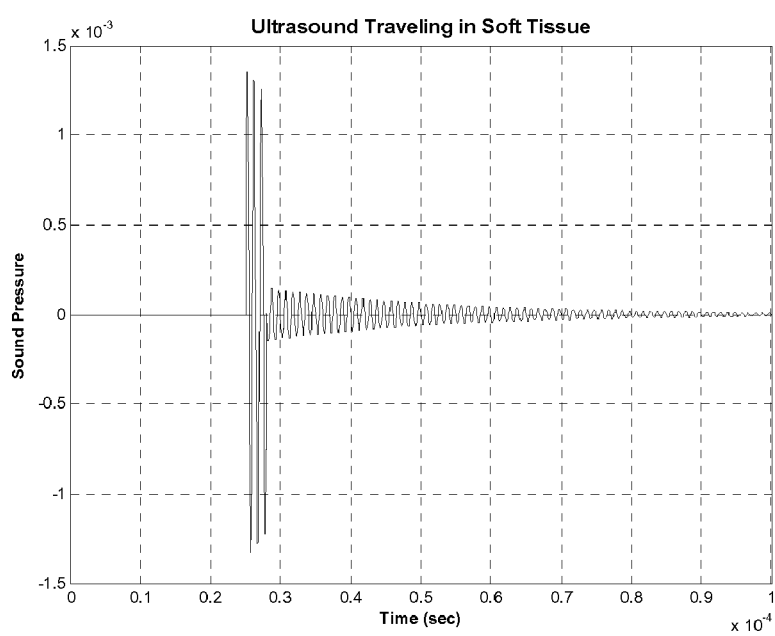
FIG. 42 includes plots of interference for the propagation of sonic signals, produced by single-pulse (basic) LTP drive signals, through soft tissue (FIG. 42A), through bone (FIG. 42B), and through a combination of bone and soft tissue (FIG. 42C), in accordance with an embodiment of the invention.
Figure 42B:
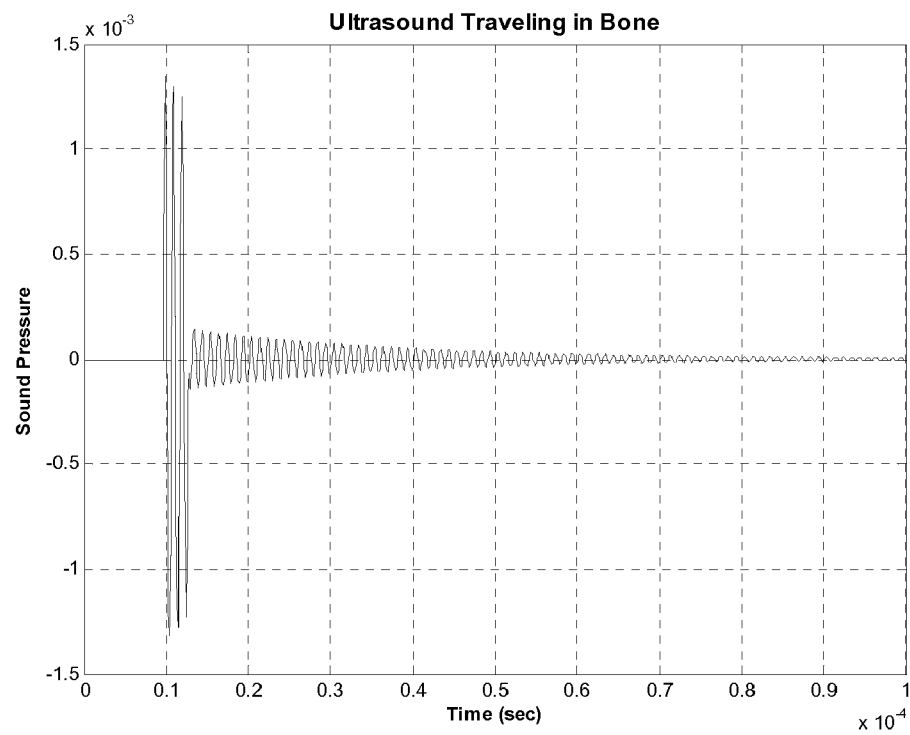
Figure 42C:
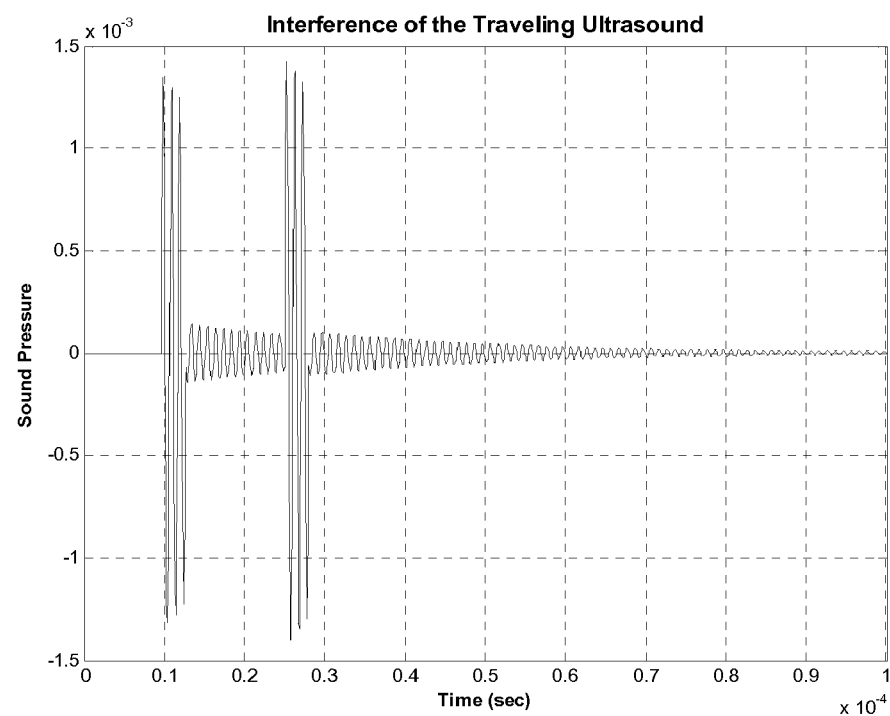
Figure 43A:
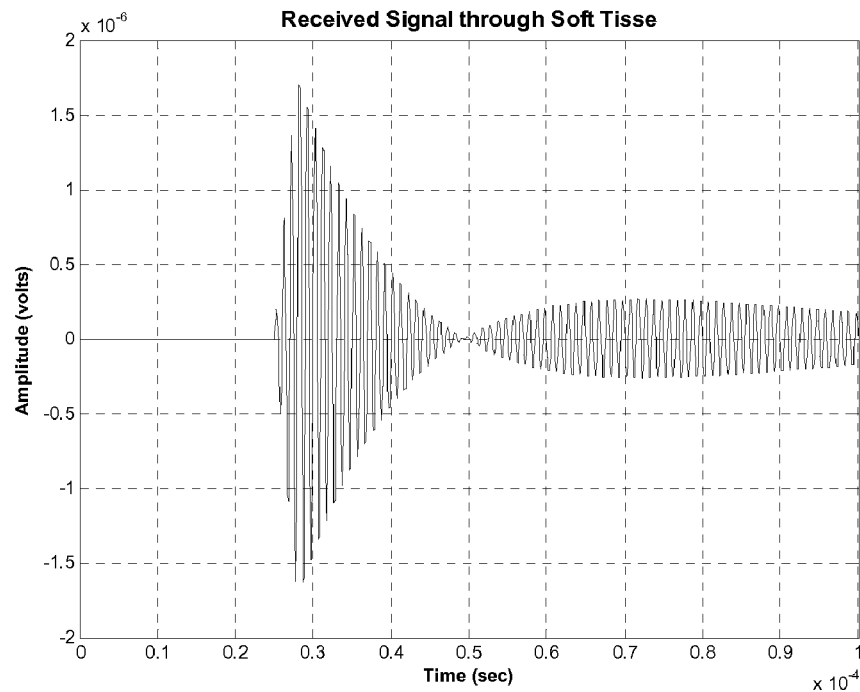
FIG. 43 includes plots of sonic signals received at a receiver, arising from the single-pulse LTP drive signals of FIG. 41, that have traveled through soft tissue (FIG. 43A), through bone (FIG. 43B), and through a combination bone and soft tissue (FIG. 43C), in accordance with an embodiment of the invention.
Figure 43B:
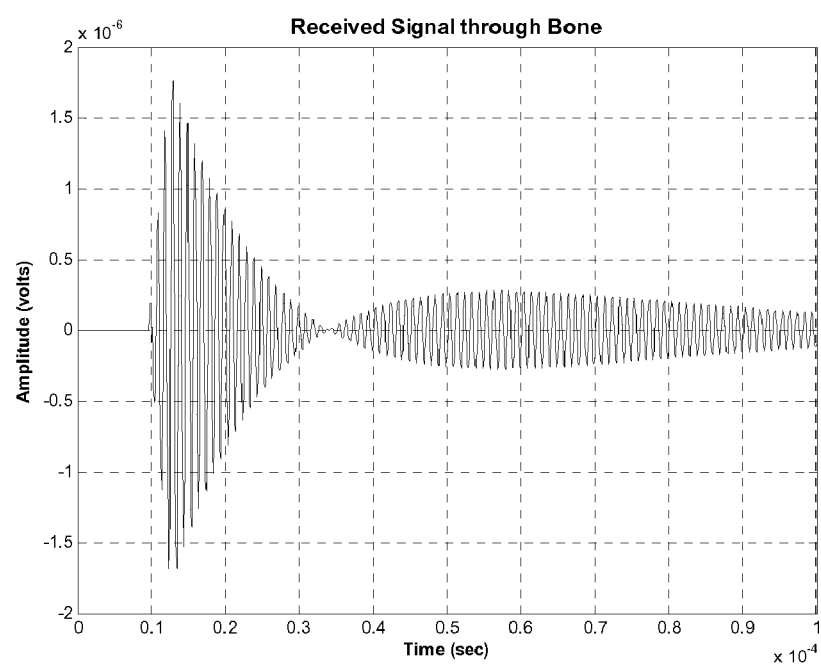
Figure 43C:
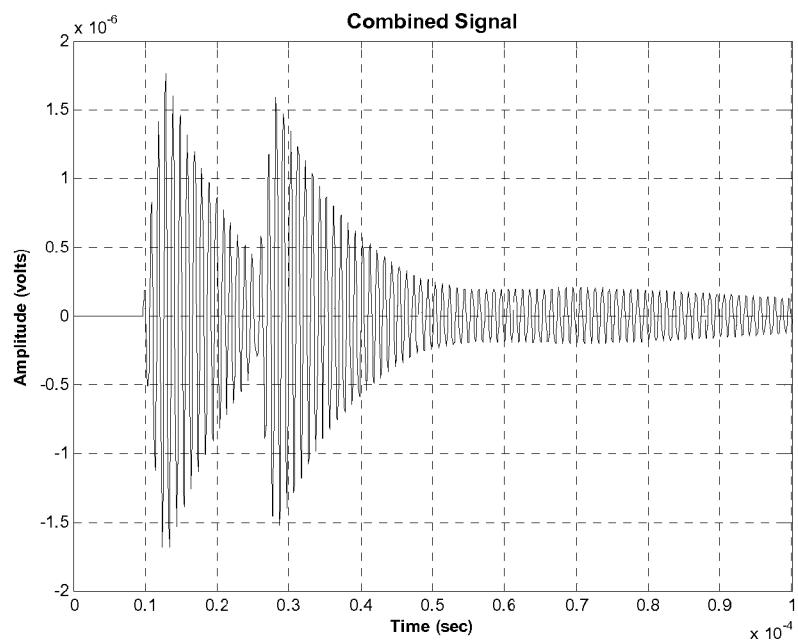
Figure 44A:
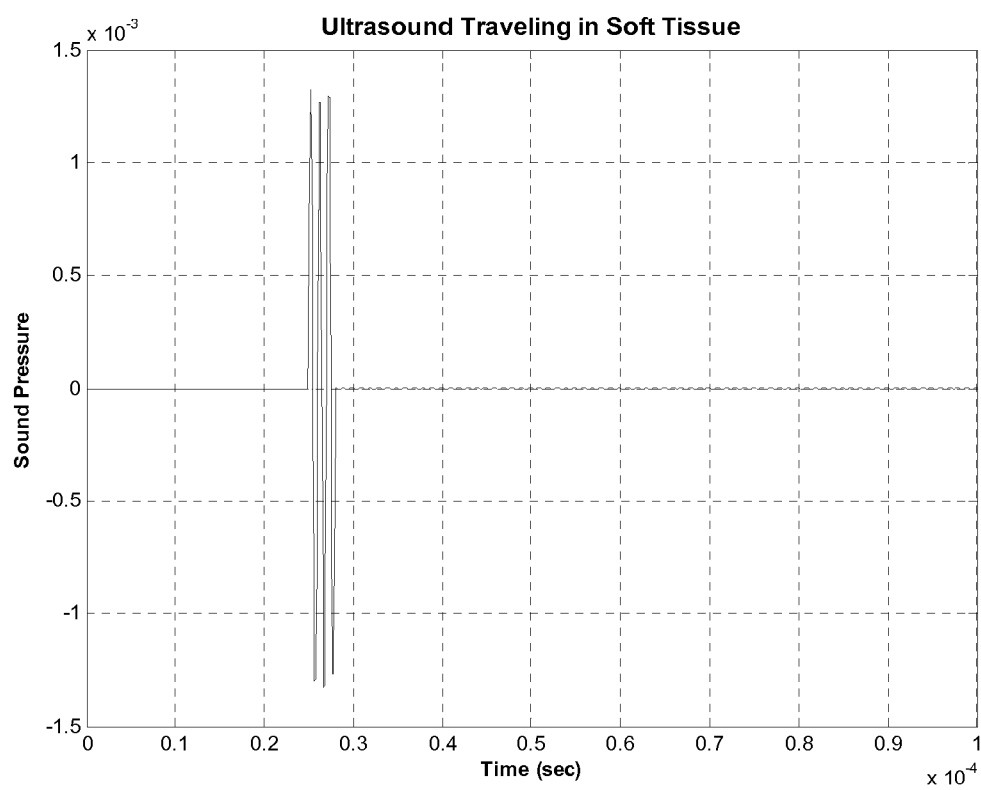
FIG. 44 includes plots of interference for the propagation of sonic signals, produced by two-pulse (transmitter-optimized) LTP drive signals, through soft tissue (FIG. 44A), through bone (FIG. 44B), and through a combination bone and soft tissue (FIG. 44C), in accordance with an embodiment of the invention.
Figure 44B:
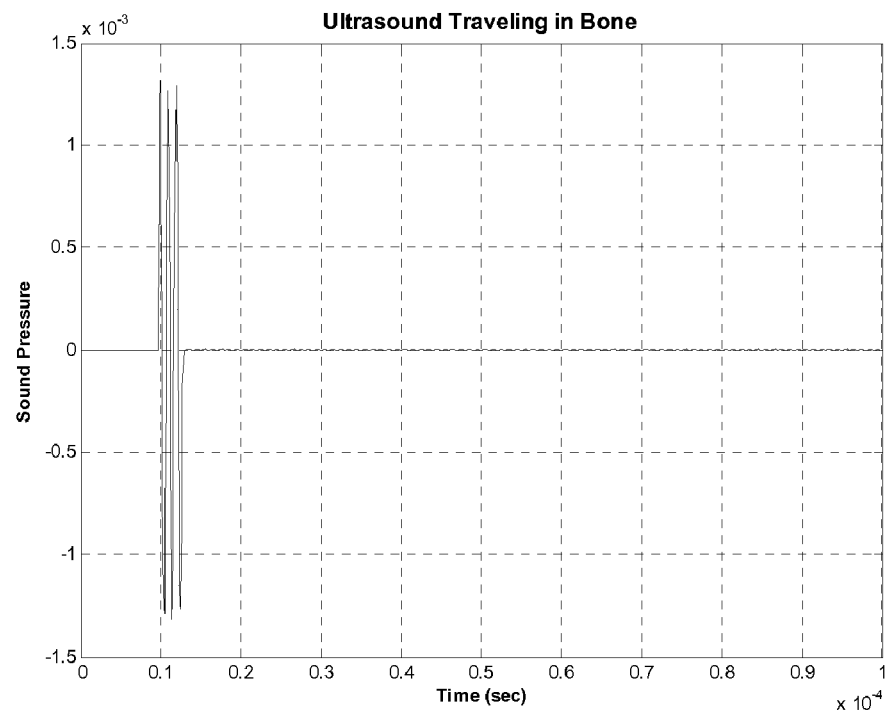
Figure 44C:
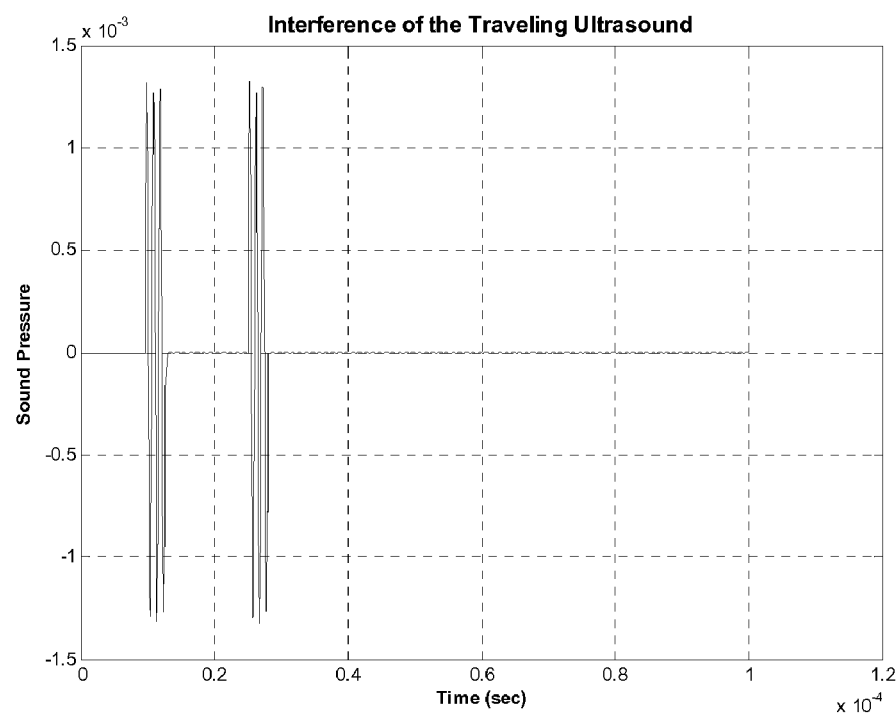
Figure 45A:
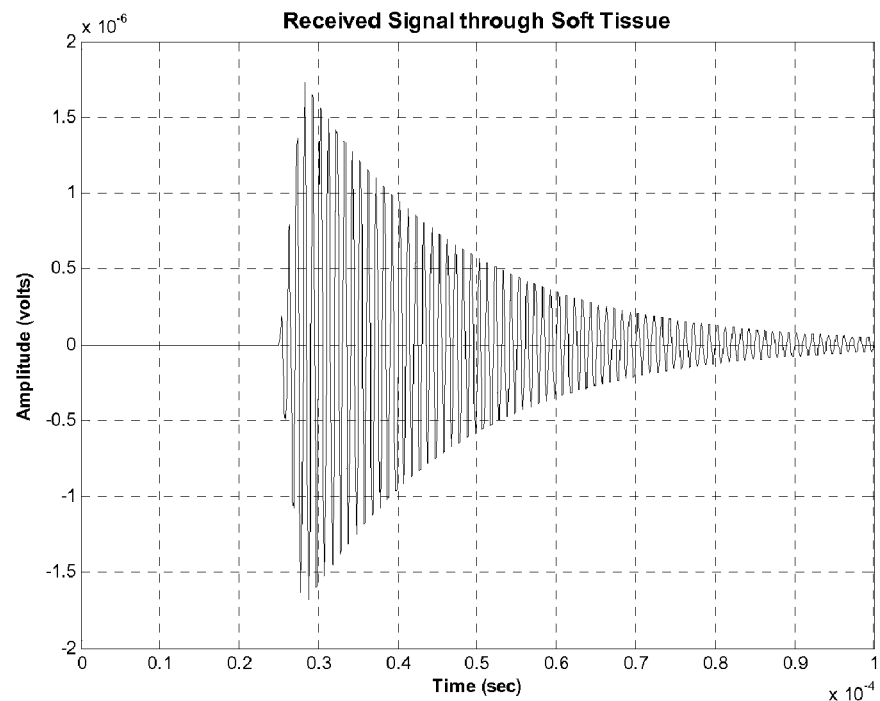
FIG. 45 includes plots of the propagation of sonic signals, arising from two-pulse LTP drive signals, through soft tissue (FIG. 45A), through bone (FIG. 45B), and through a combination bone and soft tissue (FIG. 45C), in accordance with an embodiment of the invention.
Figure 45B:
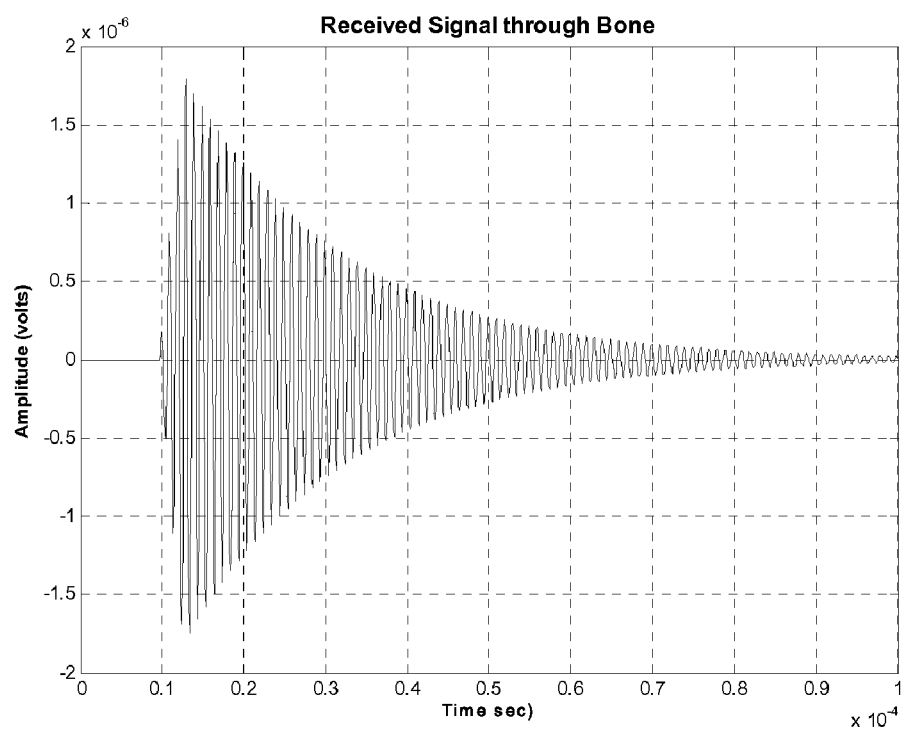
Figure 45C:
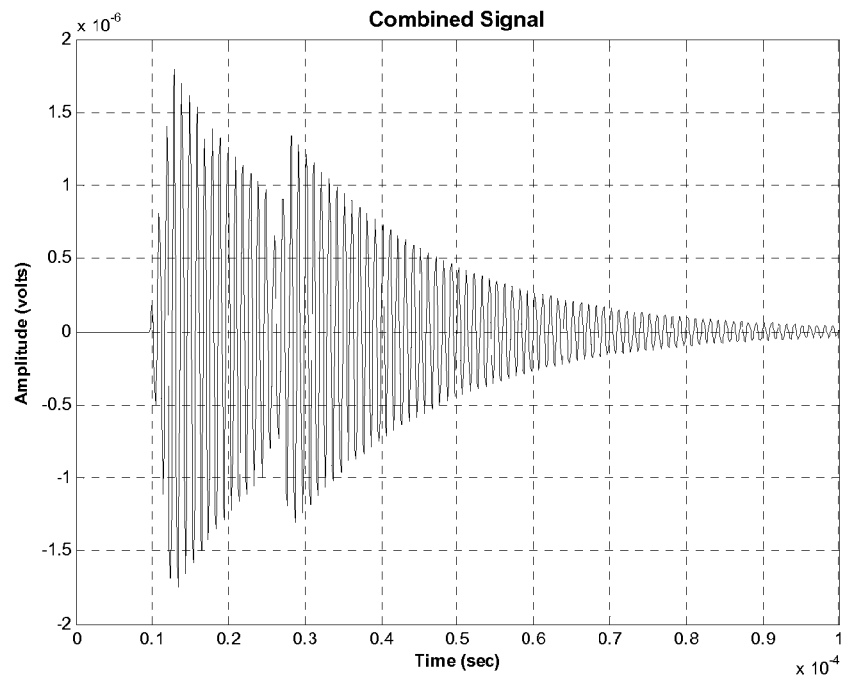
Figure 46A:
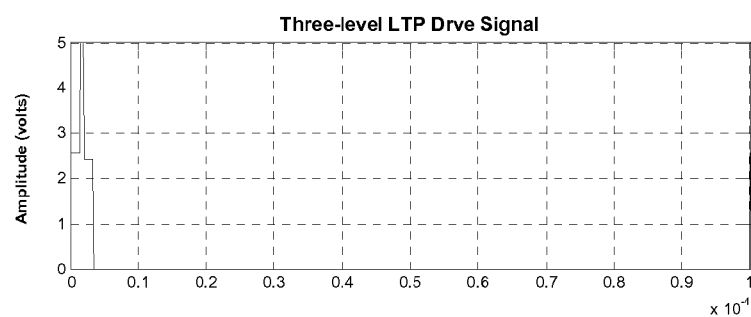
FIG. 46A is a time domain plot of a three-level LTP drive signal (transmitter and receiver optimized signal) in accordance with an embodiment of the present invention.
Figure 46B:
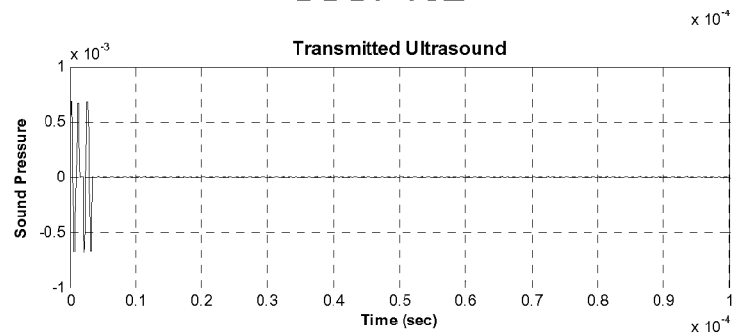
FIG. 46B is a transmitted sonic signal emerging from a transducer excited with the LTP drive signal of FIG. 46A.
Figure 47A:
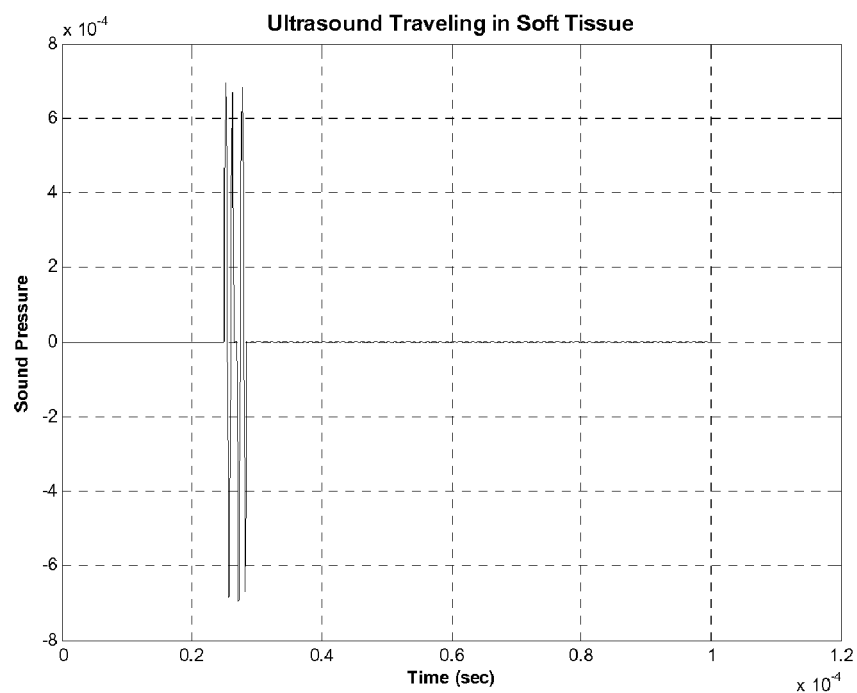
FIG. 47 includes plots of sonic signals, produced by three-level (transmitter and receiver optimized) LTP drive signals, in which the sonic signals propagate through soft tissue (FIG. 47A), through bone (FIG. 47B), and through a combination bone and soft tissue (FIG. 47C), in accordance with an embodiment of the invention.
Figure 47B:
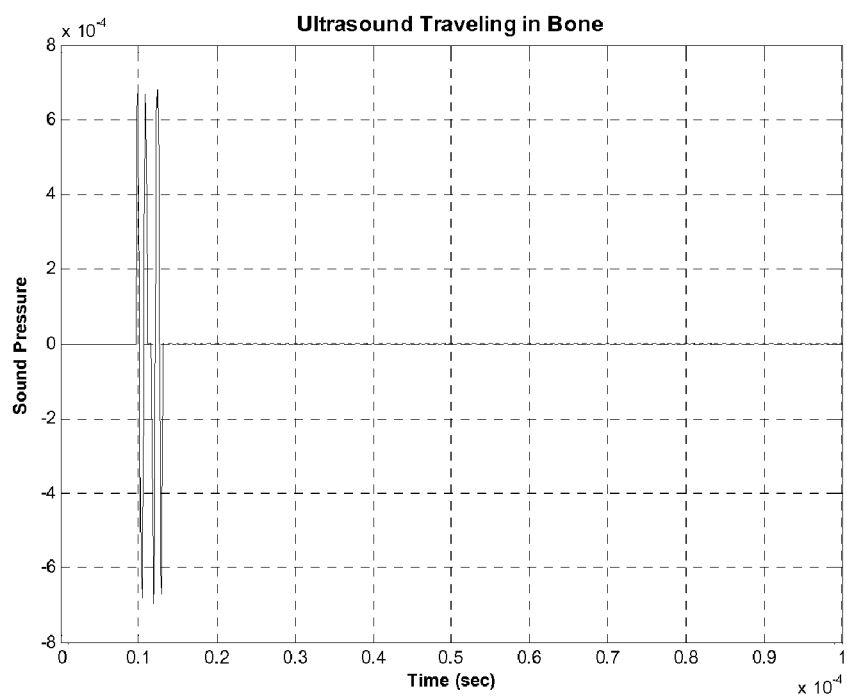
Figure 47C:
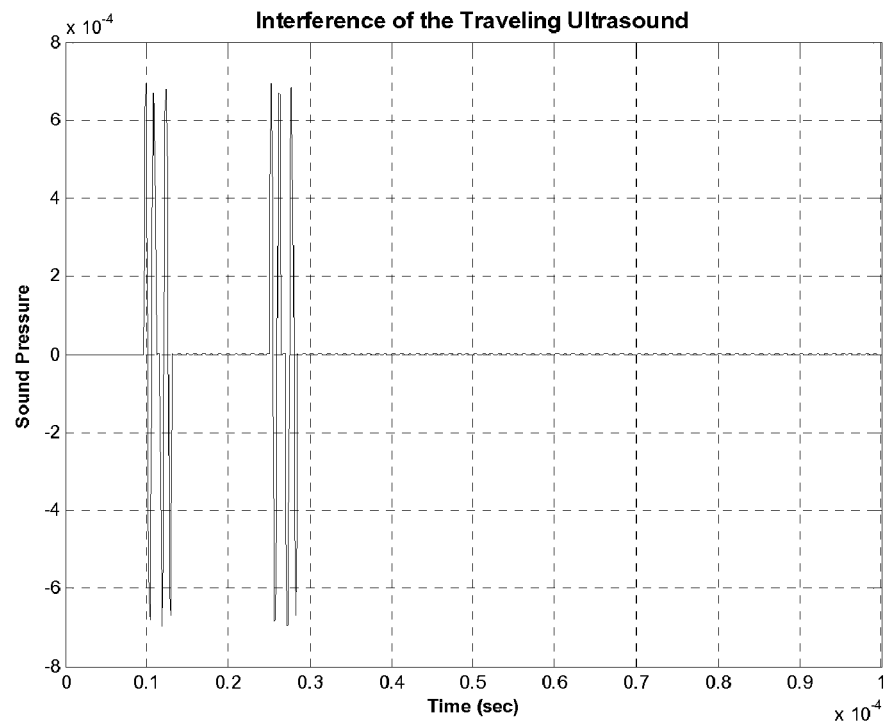
Figure 48A:
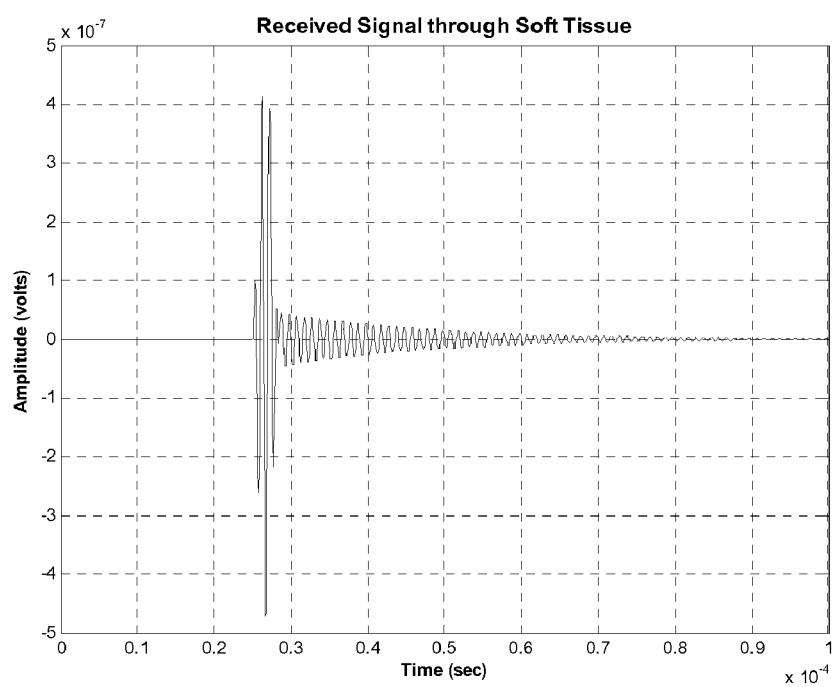
FIG. 48 includes plots of sonic signals arising from three-level LTP drive signals, in which the sonic signals have traveled through soft tissue (FIG. 48A), through bone (FIG. 48B), and through a combination bone and soft tissue (FIG. 48C), in accordance with an embodiment of the invention.
Figure 48B:
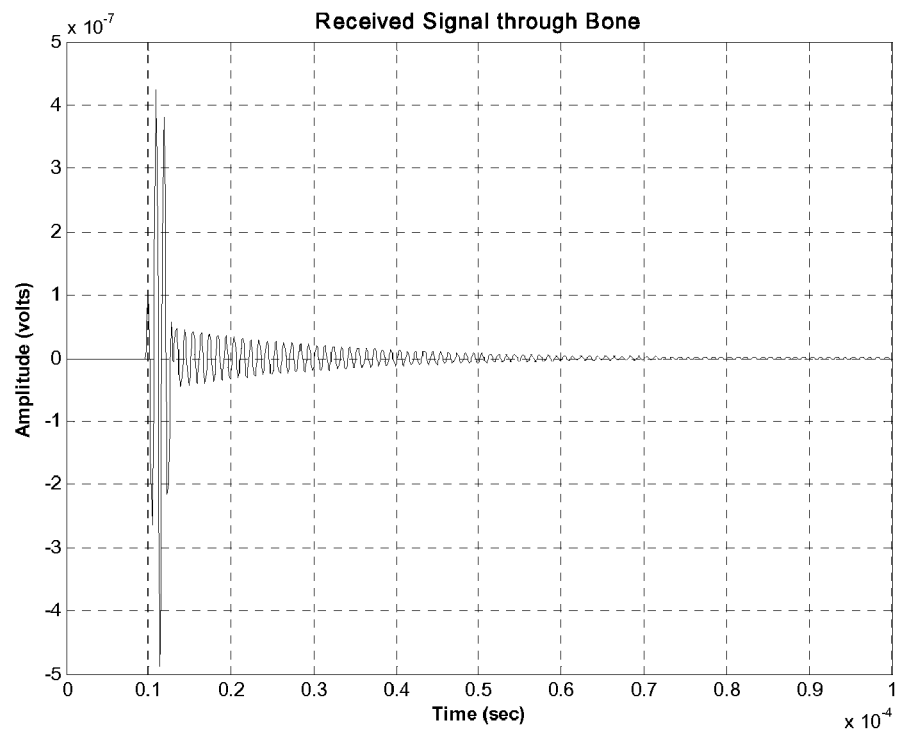
Figure 48C:
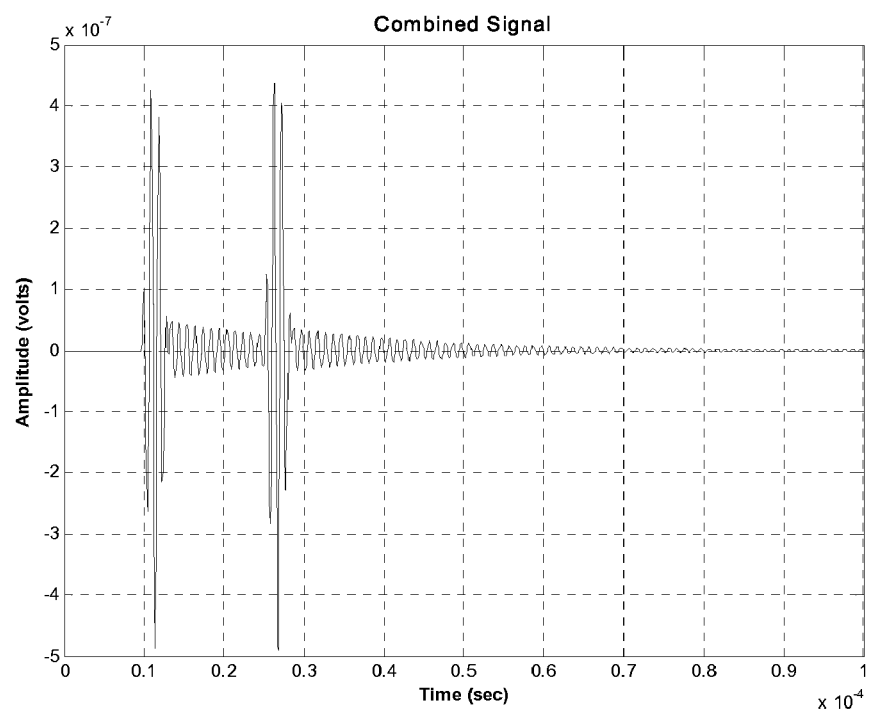

FIG. 38 is a block diagram of a system and method for acquiring simulation data employing the signal transmission configuration shown in FIG. 37.

The ultrasonic transducers used in the simulations are assumed to have a resonant frequency of 1 MHz and damping factors 0.006 and 0.008 for the transmitter and receiver, respectively. To capture the ultrasonic transducers characteristics up to the first resonance (first resonant frequency), the transmitter and the receiver are approximated by second order transfer functions $G_{Tx}(s)$ and $G_{Rx}(s)$ as follows.

$$G_{Tx}(s) = \frac{1800s}{s^2 + 7.53998 \times 10^4 s + 3.9478 \times 10^{13}} \tag{30}$$

$$G_{Rx}(s) = \frac{1000s}{s^2 + 1.0053 \times 10^5 s + 3.9478 \times 10^{13}} \tag{31}$$

Drive Signals

A simulated rectangular modulation pulse (RMP) drive, transmitted acoustic signal, and receiver output signal are depicted in FIG. 17, which was previously discussed herein. For the RMP method in this section, the drive signal is a 10 KHz pulse train with 5% duty cycle modulated by a 1 MHz sine wave.

The characteristics of the RMP drive signal, the transmitted acoustic signal, and the receiver acoustic signal are shown in FIG. 17 (parts A, B, and C). Likewise, the characteristics of two-pulse LPT drive signal, the transmitted acoustic signal generated thereby, and the signal received by the receiving transducer are shown in FIG. 18. The operating frequencies used for simulation in this section for the RMP and two-pulse LTP signals differ from those depicted in FIGS. 17 and 18, respectively. However, since FIGS. 17-18 fully illustrate the reduction in transient energy in the output acoustic signal obtained by employing two-pulse LTP drive signals instead of RMP drive signals, the graphs of drive signal, and output acoustic signals for the RMP and two-pulse LTP signal are not presented in this section. However, graphs of the acoustic signals in the traveling paths and of the received signals for RMP and the two-pulse LTP drive signals are provided in the drawings, along with similar graphs for the other types of LTP drive signals.

For n=3, which corresponds to having three cycles of acoustic signal output, the simulated LTPs are shown in FIGS. 41-48, and discussed above in the Brief Description of the Drawings.

Since the graphs in FIGS. 39-48 are discussed in the Brief Description of the Drawings, for the sake of brevity, those descriptions are not repeated in this section.

The foregoing describes the design, simulation, and experiment results of a novel low transient pulse generation scheme for ultrasonic ranging systems. Based on a modified version of the input command shaping scheme, low transient pulse (LTP) excitation offers improvements over the rectangular modulation pulse (RMP) excitation in the application of the ultrasound measurement. First, with its low acoustic transient characteristic, LTP greatly reduces the interference between acoustic echoes from the surfaces and thus achieves higher resolution than RMP scheme. Second, unlike the RMP method, LTP does not require modulation circuits to generate the drive signal. Instead, high-speed logic gate arrays (such as FPGA) can easily implement the LTP drive signal. Finally, LTP pulse generation methods can be used in conjunction with existing detection algorithms to yield further detection enhancements.

Herein, pressure wave energy may be directed at a target, and pressure wave energy reflected from the target may be used to calculate one or more characteristics of the target. In the embodiment discussed in connection with FIG. 1, reflected pressure wave energy may be employed to measure one or more characteristics of the surface topology of the target from which pressure wave energy is reflected. For surface topology measurement, it is preferred that most of the transmitted pressure wave energy be reflected by the surface of the target rather than by layers of the target located toward the interior of the target material.

In other embodiments, the target may include a heterogeneous three-dimensional structure that includes different materials having different physical and/or acoustic properties, and which may absorb pressure wave energy from a transmitting transducer beyond the target surface into the interior of a volume of the target. In such embodiments, reflected pressure wave energy may be used to measure acoustic properties of one or more separate layers and/or of one or more separate material components of the target.

For example, an embodiment of the present invention could direct pressure waves toward a target material in which various of the constituent features possess different respective acoustic properties (such as impedance, elastic modulus, or density). By measuring pressure waves that are reflected from the target material, the size, position, and/or other characteristics of such features may be measured. One possible application of this method may include the detection of lumps/tumors in human soft tissue such as the breast. However, the invention is not so limited. The above-described method may be applied to measuring other characteristics, including other irregularities, of other portions of the human body. Moreover, the properties of heterogeneous three-dimensional structures other than the human body may be measured.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

REFERENCES

The following references are incorporated by reference herein in their entirety.
1. Altes, R. A., and Reese, W. E., "Doppler-tolerant classification of distributed targets-a bionic sonar," *IEEE Transactions on Aerospace and Electronic Systems AES*-11, pp. 708-724, 1975.
2. Altes, R. A., "Sonar for generalized target description and its similarity to animal echolocation systems," *Journal of the Acoustical Society of America* 59, pp. 97-105, 1976.
3. Ashley, S., "Wrap drive underwater," *Sci. Amer., vol.* 284, pp. 70-79, May 2001.
4. Berkhout, A. J., "*Seismic Resolution. Resolving Power of Acoustical Echo Techniques*," Geophysical Press, London, 1984.
5. Chang, T. N., Godbole, K., and Hou, E., "Optimal input shaper design for high-speed robotic workcells," *Journal of Vibration and Control*, Vol. 9, pp. 1359-1376, 2003.
6. Cobo, P., and Carbo, R., "Parametric equalization of sonar transducers by shaping pre-filtering and its effect on the directivity pattern," *Acta Acustica* 1, pp. 101-109, 1993.
7. Cobo, P., "Application of shaping deconvolution to the generation of arbitrary acoustic pulses with conventional sonar transducers," *Journal of Sound and Vibration* 188(1), pp. 131-144, 1995.
8. Gachagan, A., Hayward, G., Kelly, S. P., Galbraith, W., "Characterization of air-coupled transducers," *IEEE Transactions on Ultrasonics, Ferroelectrics, and Frequency Control*, Volume 43, Issue 4, July 1996, Pages 678-689.
9. Hayward, G., MacLeod, C. J., Durrani, T. S., "Systems model of the thickness mode piezoelectric transducer," *Journal of the Acoustical Society of America* Volume 76, Issue 2, August 1984, Pages 369-382.
10. Li, Xi, Wu, Renbiao, Rasmi, Srihari, Li, Jian, Cattafesta, Louis N. III, and Sheplak, Mark, "Acoustic Proximity Ranging in the Presence of Secondary Echoes," *IEEE Transactions on Instrumentation and Measurement*, vol. 52, no. 5, pp. 1593-1605, 2003.

11. Mandersson, Bengt and Salomonsson, Göran, "Weighted Least-Squares Pulse-Shaping Filters With Application to Ultrasonic Signals," *IEEE Transactions on Ultrasonics, Ferroelectrics, and Frequency Control*, vol. 36, No. 1, pp. 109-113, 1989.
12. Manthey, W., Kroemer, N., and Mágori, V., "Ultrasonic transducers and transducer arrays for applications in air," *Meas. Sci. Technol.*, vol. 3, pp. 249-261, 1992.
13. Piquette, J. C., "Method for transducer transient suppression. I: Theory," *Journal of the Acoustical Society of America* 92, pp. 1203-1213, 1992.
14. Piquette, J. C., "Method for transducer transient suppression. II: Experiment," *Journal of the Acoustical Society of America* 92, pp. 1214-1221, 1992.
15. Piquette, J. C., and Forsythe, S. E., "Transducer transient suppression: Generalized methods of analysis," *Journal of the Acoustical Society of America* 100(3), pp. 1577-1583, 1996.
16. Singer, N., and Seering, W., "Preshaping Command Inputs to Reduce System Vibration," *ASME J. Dynamic Systems, Measurement, and Control* 112(1), pp. 76-82, 1990.
17. Skinner, D. P., Altes, R. A., and Jones, J. D., "Broadband target classification using a bionic sonar," *Journal of the Acoustical Society of America* 62, pp. 1239-1246, 1977.

The invention claimed is:

1. A method for measurement comprising:
providing an input command signal;
convolving the input command signal with a plurality of impulse signals to produce a transducer drive signal; and
activating a first pressure transducer with the drive signal to transmit a pressure wave output from the transducer.

2. The method of claim 1 further comprising:
transmitting the pressure wave output toward a target using the first pressure transducer; and
receiving reflected pressure wave energy from the target at a second pressure transducer.

3. The method of claim 2 further comprising:
calculating at least one geometric characteristic of a surface topology of the target based on the reflected pressure wave energy.

4. The method of claim 2 wherein the target includes a heterogeneous three-dimensional structure.

5. The method of claim 4 further comprising:
calculating at least one acoustic property of the structure.

6. The method of claim 1 further comprising:
transmitting the pressure wave output from a first point along a medium to a second point along a medium using the first pressure transducer;
receiving pressure wave energy using a second pressure transducer located at the second point along the medium; and
calculating at least one characteristic of the medium based on the received pressure wave energy.

7. The method of claim 6 wherein the medium includes at least one material selected from the group consisting of: solid, liquid, and gas.

8. The method of claim 6 wherein the medium includes at least one material selected from the group consisting of: bone, body tissue, wood, metal, concrete, plastic, glass, and ceramic.

9. The method of claim 1 wherein the input command signal is a function selected from the group consisting of: a rectangular step function; a triangular function; a sinusoidal function; and a Gaussian function.

10. The method of claim 1 wherein the convolving step comprises:
convolving the input command signal with first and second impulse signals.

11. The method of claim 8 wherein the second impulse signal has a lower magnitude than the first impulse signal.

12. The method of claim 1 wherein the transmitting step comprises:
transmitting only a selected number of cycles of the pressure wave output.

13. The method of claim 1 wherein the pressure wave output comprises an acoustic signal.

14. The method of claim 13 wherein the acoustic signal is one of:
a) subsonic; and
b) ultrasonic.

15. The method of claim 13 wherein the acoustic signal has a frequency within a range audible to human beings.

16. The method of claim 13 wherein the acoustic signal has a frequency between 20 Hz (Hertz) and 18 kHz (kilohertz).

17. The method of claim 1 wherein a first said impulse signal has an amplitude $A_1$ equal to about:
$1/(1+M_p^n)$, wherein $$M_p^n = \left(e^{-\frac{\zeta\pi}{\sqrt{1-\zeta^2}}}\right)^n,$$

$\zeta$ is the damping factor; and n is the number of half ringing cycles.

18. The method of claim 17 wherein a second said impulse signal has an amplitude $A_2$ equal to about:
$M_p^n/(1+M_p^n)$, wherein $$M_p^n = \left(e^{-\frac{\zeta\pi}{\sqrt{1-\zeta^2}}}\right)^n,$$

$\zeta$ is the damping factor; and n is the number of half ringing cycles.

19. The method of claim 1 wherein a first said impulse signal has an amplitude $A_1$ determined according to:
$A_1=1/(1+M_p^n)$, wherein $$M_p^n = \left(e^{-\frac{\zeta\pi}{\sqrt{1-\zeta^2}}}\right)^n,$$

$\zeta$ is the damping factor; and n is the number of half ringing cycles.

20. The method of claim 19 wherein a second said impulse signal has an amplitude determined according to:
$A_2=M_p^n/(1+M_p^n)$, wherein $$M_p^n = \left(e^{-\frac{\zeta\pi}{\sqrt{1-\zeta^2}}}\right)^n,$$

$\zeta$ is the damping factor; and n is the number of half ringing cycles.

21. The method of claim 1 wherein a time period between a first said impulse signal and a second said impulse signal is determined according to:

$\Delta T = n\pi/(\omega_n\sqrt{1-\zeta^2})$, wherein: n is the number of half ringing cycles, $\omega_n$ is the natural frequency of the first pressure transducer; and $\zeta$ is the damping factor of the first transducer.

22. The method of claim 21 wherein the drive signal includes a pulse corresponding to each said impulse signal, and wherein the pulse width of each said pulse is equal to $\Delta T$.

23. The method of claim 21 wherein the drive signal includes a pulse corresponding to each said impulse signal, and wherein the pulse width of each said pulse is equal to $4\Delta T/3$.

24. A method for measurement comprising:
providing an input command signal;
convolving the input command signal with an impulse signal to produce a transducer drive signal;
activating a pressure transducer with the drive signal to transmit a pressure wave output from the transducer; and
setting a pulse width of the drive signal equal to a value within +/−20% of $k2\pi/\omega_d$ where $\omega_d$ is a ringing frequency of the transducer, and where k is equal to any integer greater than or equal 1.

25. The method of claim 24 wherein the step of setting the pulse width comprises setting the pulse width of the drive signal equal to a value within +/−5% of $k2\pi/\omega_d$.

26. A measurement system comprising:
a signal generator operable to:
provide an input command signal, and
convolve the input command signal with a plurality of impulse signals to produce a transducer drive signal; and
a first pressure transducer operable to transmit a pressure wave output from the transducer upon being excited by the transducer drive signal.

27. The measurement system of claim 26 wherein the signal generator comprises:
at least one timer for controlling the scheduling of the plurality of impulse signals.

28. The measurement system of claim 26 further comprising a second pressure transducer, located proximate to the first pressure transducer, for receiving reflections of the transmitted pressure wave output.

29. The measurement system of claim 26 further comprising a second pressure transducer, located at a distance D from the first pressure transducer, for receiving pressure wave energy transmitted along the distance D.

30. The measurement system of claim 29 wherein axial wave transmission occurs between the first transducer and the second transducer.

31. The measurement system of claim 26 further comprising:
at least one additional transmitting pressure transducer, thereby providing a plurality of transmitting pressure transducers; and
at least one receiving pressure transducer for receiving pressure wave energy from the plurality of transmitting pressure transducers.

* * * * *